(12) United States Patent
Sashima et al.

(10) Patent No.: US 10,185,130 B2
(45) Date of Patent: Jan. 22, 2019

(54) VARIABLE MAGNIFICATION OPTICAL SYSTEM, OPTICAL DEVICE, AND METHOD FOR MANUFACTURING VARIABLE MAGNIFICATION OPTICAL SYSTEM

(71) Applicant: NIKON CORPORATION, Tokyo (JP)

(72) Inventors: Tomoyuki Sashima, Tokyo (JP); Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 127 days.

(21) Appl. No.: 14/700,703

(22) Filed: Apr. 30, 2015

(65) Prior Publication Data

US 2015/0234163 A1 Aug. 20, 2015

Related U.S. Application Data

(63) Continuation of application No. PCT/JP2013/079242, filed on Oct. 29, 2013.

(30) Foreign Application Priority Data

Jan. 15, 2013 (JP) .................. 2013-004650
Jan. 15, 2013 (JP) .................. 2013-004651
Jan. 15, 2013 (JP) .................. 2013-004652

(51) Int. Cl.
*G02B 15/14* (2006.01)

(52) U.S. Cl.
CPC ......... *G02B 15/14* (2013.01); *Y10T 29/49826* (2015.01)

(58) Field of Classification Search
CPC .................................................. G02B 15/14
(Continued)

(56) References Cited

U.S. PATENT DOCUMENTS 6,025,962 A 2/2000 Suzuki
7,982,967 B2 7/2011 Fujisake
(Continued)

FOREIGN PATENT DOCUMENTS

CN 101315457 A 12/2008
CN 102053345 A 5/2011
(Continued)

OTHER PUBLICATIONS

English Translation of International Preliminary Report on Patentability from International Patent Application No. PCT/JP2013/079242, dated Jul. 30, 2015.
(Continued)

*Primary Examiner* — James Jones
(74) *Attorney, Agent, or Firm* — Shapiro, Gabor and Rosenberger, PLLC

(57) ABSTRACT

A variable magnification optical system includes, in order from an object side, a first lens group having positive refractive power; a second lens group having negative refractive power; and a third lens group having positive refractive power; upon zooming from a wide-angle end state to a telephoto end state, a distance between the first lens group and the second lens group and a distance between the second lens group and the third lens group being varied. The variable magnification optical system further includes a V lens group GV having negative refractive power and being moved to have a component in a direction perpendicular to the optical axis, and an F lens group GF having positive refractive power and being moved along the optical axis upon focusing from an infinitely distant object to a close object, the V lens group GV being disposed on the more object side than the F lens group GF. Thereby, it is possible to provide the compact variable magnification optical system with a high zoom ratio and high performance, an optical
(Continued)

apparatus therewith and a method for manufacturing the variable magnification optical system.

28 Claims, 12 Drawing Sheets

(58) Field of Classification Search
 USPC .......................................................... 359/686
 See application file for complete search history.

(56) References Cited

U.S. PATENT DOCUMENTS

| | | | |
|---|---|---|---|
| 8,339,714 B2 | 12/2012 | Tochigi et al. | |
| 8,379,114 B2 | 2/2013 | Touchi et al. | |
| 8,416,506 B2 | 4/2013 | Ito | |
| 8,503,094 B2 | 8/2013 | Sato | |
| 8,537,249 B2 | 9/2013 | Imaoka et al. | |
| 8,736,968 B2 | 5/2014 | Sato et al. | |
| 8,982,477 B2 | 3/2015 | Wada | |
| 2009/0244720 A1* | 10/2009 | Yamaguchi | G02B 15/14 359/690 |
| 2010/0214658 A1 | 8/2010 | Ito | |
| 2011/0026133 A1 | 2/2011 | Fujisake | |
| 2011/0102905 A1 | 5/2011 | Harada | |
| 2011/0149412 A1 | 6/2011 | Sato | |
| 2011/0176224 A1 | 7/2011 | Sato et al. | |
| 2011/0261250 A1 | 10/2011 | Touchi et al. | |
| 2012/0050603 A1 | 3/2012 | Imaoka et al. | |
| 2012/0092777 A1 | 4/2012 | Tochigi et al. | |
| 2012/0300313 A1 | 11/2012 | Wada | |

FOREIGN PATENT DOCUMENTS

| | | |
|---|---|---|
| CN | 102798965 A | 11/2012 |
| JP | 01-241513 A | 9/1989 |
| JP | 10-111456 A | 4/1998 |
| JP | 2010-032700 A | 2/2010 |
| JP | 2010-044190 A | 2/2010 |
| JP | 2010-191334 A | 9/2010 |
| JP | 2011-033868 A | 2/2011 |
| JP | 2011-232543 A | 11/2011 |
| JP | 2012-047814 A | 3/2012 |
| JP | 2012-083601 A | 4/2012 |

OTHER PUBLICATIONS

Office Action dated Mar. 15, 2018, in Chinese Patent Application No. 201380057204.2.

Office Action dated Jun. 26, 2017, in Chinese Patent Application No. 201380057204.2.

Office Action dated Aug. 11, 2016, in Chinese Patent Application No. 201380057204.2.

* cited by examiner

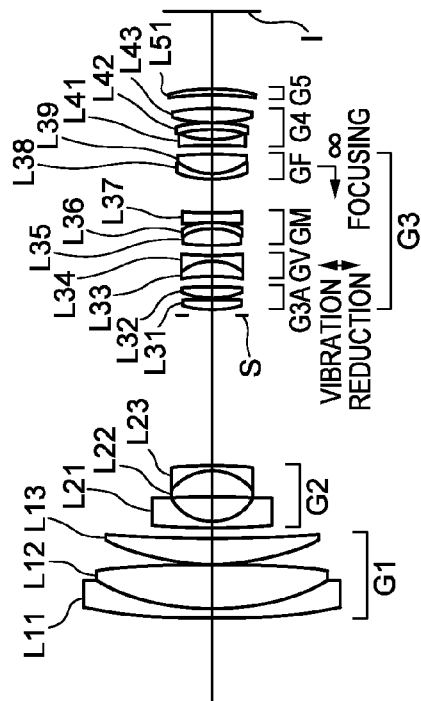
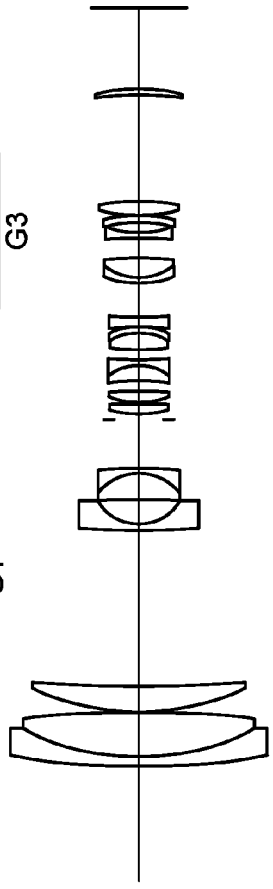
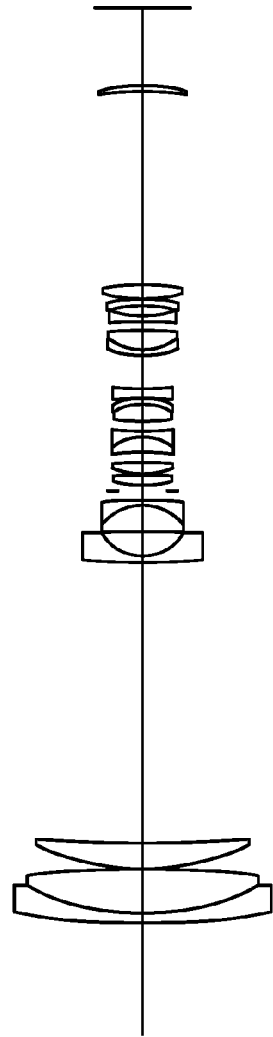
FIG. 1A
FIG. 1B
FIG. 1C

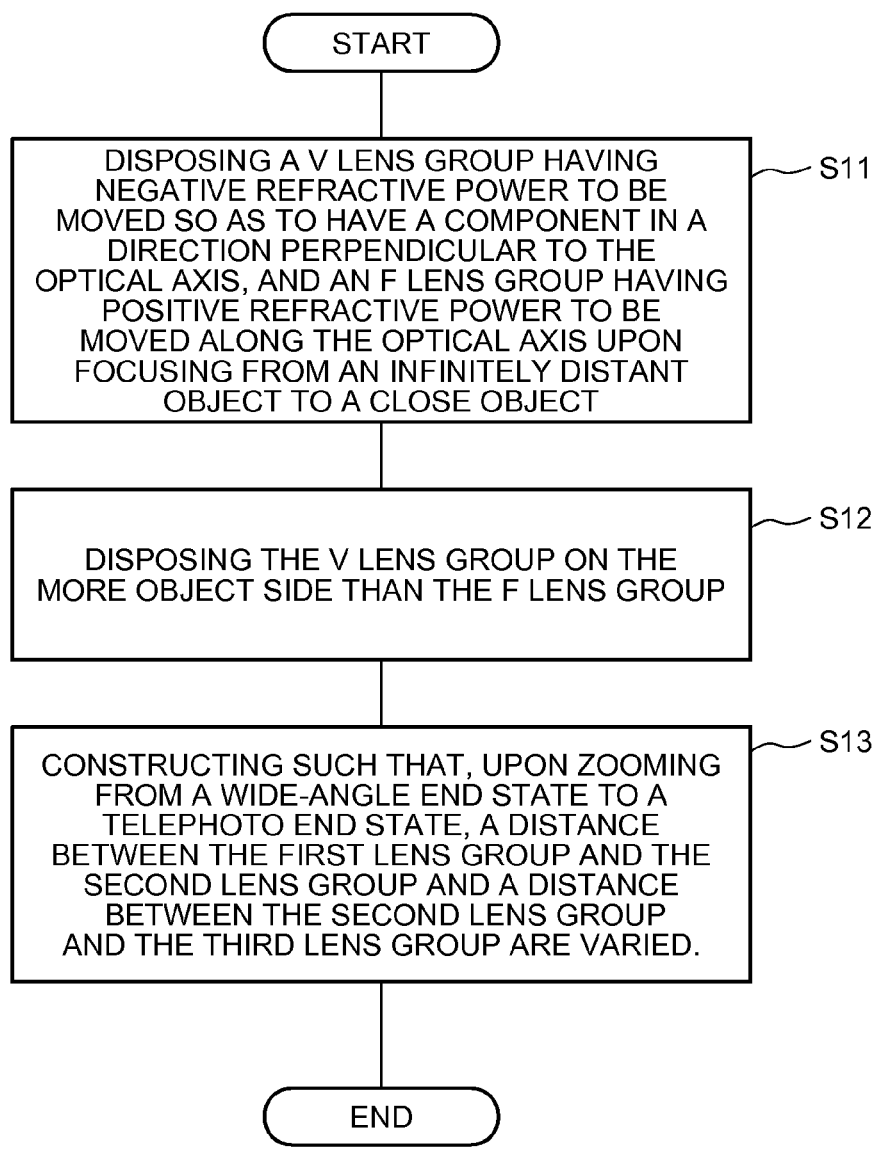

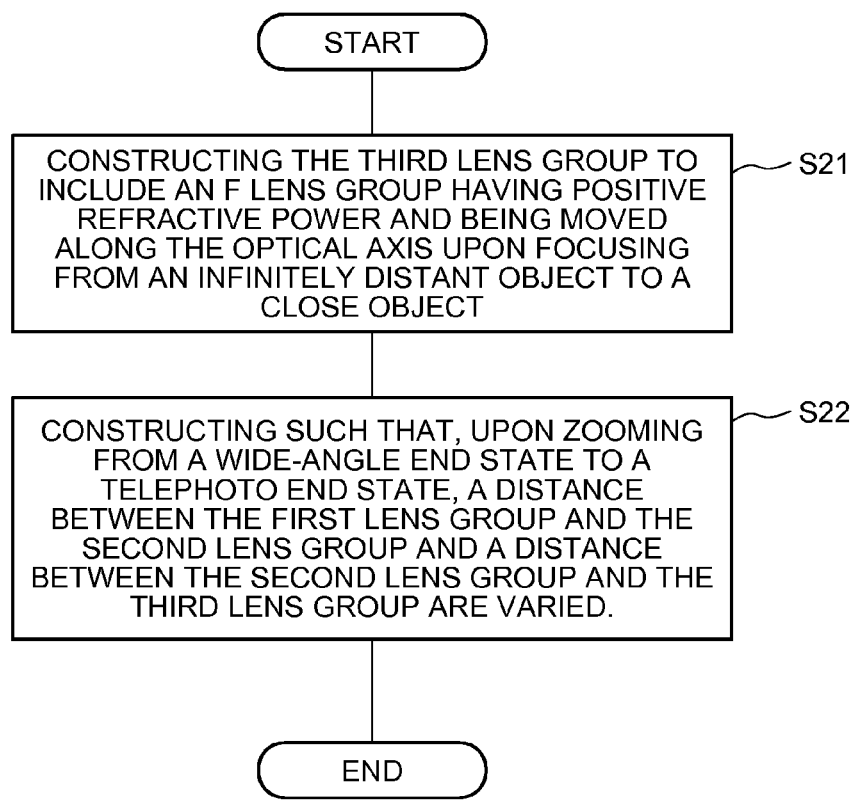

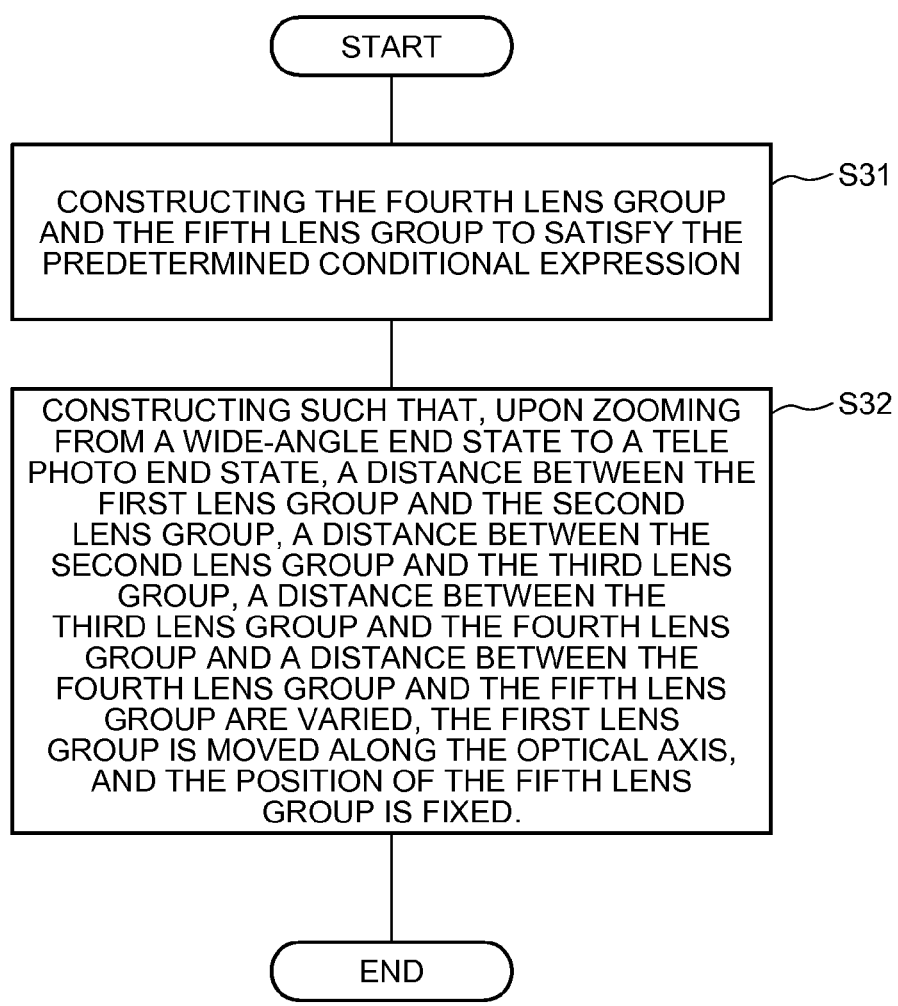

VARIABLE MAGNIFICATION OPTICAL SYSTEM, OPTICAL DEVICE, AND METHOD FOR MANUFACTURING VARIABLE MAGNIFICATION OPTICAL SYSTEM

TECHNICAL FIELD

The present invention relates to a variable magnification optical system, an optical apparatus therewith and a method for manufacturing the variable magnification optical system.

BACKGROUND ART

Conventionally, there has been proposed many a variable magnification optical system whose most object side lens group has positive refractive power suitable for an interchangeable lens for a camera, a digital camera, a video camera or the like. For example, refer to Japanese Patent Application Laid-Open No. 2011-232543.

PRIOR ART REFERENCE DOCUMENT

Patent Document

Patent Document 1: Japanese Patent Application Laid-Open No. 2011-232543

SUMMARY OF THE INVENTION

Problems to be Solved by the Invention

However, in the conventional variable magnification optical systems, while maintaining a high zoom ratio, when aiming at downsizing of the zoom optical systems, it is difficult to achieve sufficiently high optical performance.

The present invention is made in view of the above-described problem, and has an object to provide a compact variable magnification optical system with a high zoom ratio and high optical performance, an optical apparatus therewith, a method for manufacturing the variable magnification optical system.

Means for Solving the Problem

In order to solve the above-mentioned problem, according to a first aspect of the present invention there is provided a variable magnification optical system comprising, in order from an object side: a first lens group having positive refractive power; a second lens group having negative refractive power; and a third lens group having positive refractive power;

upon zooming from a wide-angle end state to a telephoto end state, a distance between the first lens group and the second lens group being varied, and a distance between the second lens group and the third lens group being varied;

a V lens group having negative refractive power and being moved so as to have a component in a direction perpendicular to the optical axis, and an F lens group having positive refractive power and being moved along the optical axis upon focusing from an infinitely distant object to a close object being disposed; and the V lens group being disposed on a more object side than the F lens group.

According to a second aspect of the present invention, there is provided an optical apparatus equipped with the variable magnification optical system according to the first aspect of the present invention.

According to a third aspect of the present invention, there is provided a variable magnification optical system comprising, in order from an object side: a first lens group having positive refractive power; a second lens group having negative refractive power; and a third lens group having positive refractive power;

upon zooming from a wide-angle end state to a telephoto end state, a distance between the first lens group and the second lens group being varied, and a distance between the second lens group and the third lens group being varied; and the third lens group including an F lens group having positive refractive power and being moved along the optical axis upon focusing from an infinitely distant object to a close object.

According to a fourth aspect of the present invention, there is provided an optical apparatus equipped with the variable magnification optical system according the third aspect of the present invention.

According to a fifth aspect of the present invention, there is provided a variable magnification optical system comprising, in order from an object side: a first lens group having positive refractive power; a second lens group having negative refractive power; a third lens group having positive refractive power; a fourth lens group having negative refractive power; and a fifth lens group having positive refractive power;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied, the first lens group being moved along the optical axis, the position of the fifth lens group being fixed; and the following conditional expression being satisfied:

$$0.170 < (-f4)/f5 < 0.400$$

where f4 denotes a focal length of the fourth lens group, and f5 denotes a focal length of the fifth lens group.

According to a sixth aspect of the present invention, there is provided an optical apparatus equipped with the variable magnification optical system according to the fifth aspect of the present invention.

According to a seventh aspect of the present invention, there is provided a method for manufacturing a variable magnification optical system comprising: in order from an object side, a first lens group having positive refractive power; a second lens group having negative refractive power; and a third lens group having positive refractive power; the method comprising the steps of:

disposing a V lens group having negative refractive power which is moved so as to have a component in a direction perpendicular to the optical axis, and an F lens group having positive refractive power which is moved along the optical axis upon focusing from an infinitely distant object to a close object;

disposing the V lens group on a more object side than the F lens group; and constructing such that, upon zooming from a wide-angle end state to a telephoto end state, a distance between the first lens group and the second lens group, and a distance between the second lens group and the third lens group are varied.

According to an eighth aspect of the present invention, there is provided a method for manufacturing a variable magnification optical system comprising: in order from an object side, a first lens group having positive refractive power; a second lens group having negative refractive power; and a third lens group having positive refractive power; the method comprising the steps of:

constructing the third lens group to include an F lens group having positive refractive power which is moved along the optical axis upon focusing from an infinitely distant object to a close object; and constructing such that, upon zooming from a wide-angle end state to a telephoto end state, a distance between the first lens group and the second lens group, and a distance between the second lens group and the third lens group are varied.

According to a ninth aspect of the present invention, there is provided a method for manufacturing a variable magnification optical system comprising: in order from an object side, a first lens group having positive refractive power; a second lens group having negative refractive power; a third lens group having positive refractive power; a fourth lens group having negative refractive power; and a fifth lens group having positive refractive power; the method comprising the steps of:

constructing the fourth lens group and fifth lens group to satisfy the following conditional expression:

$$0.170 < (-f4)/f5 < 0.400$$

where f4 denotes a focal length of the fourth lens group, and f5 denotes a focal length of the fifth lens group; and constructing such that, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied, the first lens group is moved along the optical axis, and the position of the fifth lens group is fixed.

Effect of the Invention

According to the first, second and seventh aspects of the present invention, it is possible to provide the variable magnification optical system, the optical apparatus therewith and the method for manufacturing the variable magnification optical system in which a high zoom ratio, downsizing and high optical performance can be achieved. Also, high optical performance can be achieved upon focusing and even when the lens group is moved so as to have a component in the direction perpendicular to the optical axis.

According to the third, fourth and eighth aspects of the present invention, it is possible to provide the variable magnification optical system, the optical apparatus therewith and the method for manufacturing the variable magnification optical system by which a high zoom ratio, downsizing and high optical performance can be achieved, and high optical performance can be obtained even upon focusing.

According to the fifth, sixth and ninth aspect of the present invention, it is possible to provide the variable magnification optical system, the optical apparatus and the method for manufacturing the variable magnification optical system by which a high zoom ratio, downsizing and high optical performance can be achieved.

BRIEF DESCRIPTION OF THE DRAWINGS

FIGS. 1A, 1B and 1C are sectional views showing a wide-angle end state, an intermediate focal length state and a telephoto end state of a variable magnification optical system according to a first example which is common to the first to third embodiments of the present application.

FIG. 10 is a flowchart schematically showing a method for manufacturing the variable magnification optical system according to the first embodiment of the present application.

FIG. 11 is a flowchart schematically showing a method for manufacturing the variable magnification optical system according to the second embodiment of the present application.

FIG. 12 is a flowchart schematically showing a method for manufacturing the variable magnification optical system according to the third embodiment of the present application.

EMBODIMENTS FOR CARRYING OUT THE INVENTION

First Embodiment

Figure 2A:
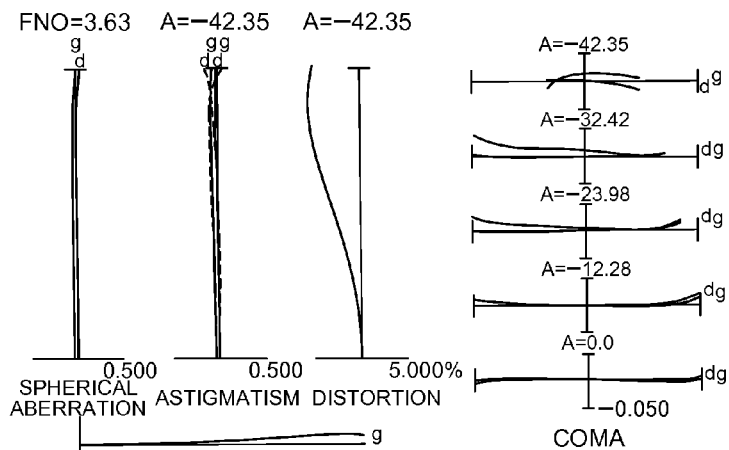
FIGS. 2A, 2B and 2C are graphs showing various aberrations upon focusing on an infinitely distant object in the wide-angle end state, in the intermediate focal length state and in the telephoto end state of the variable magnification optical system according to the first example of the present application.

Hereinafter, a variable magnification optical system according to a first embodiment of the present application, an optical apparatus therewith and a method for manufacturing the variable magnification optical system will be explained.

The variable magnification optical system according to the first embodiment of the present application comprises: in order from an object side: a first lens group having positive refractive power; a second lens group having negative refractive power; and a third lens group having positive refractive power; upon zooming from a wide-angle end state to a telephoto end state, a distance between the first lens group and the second lens group being varied, and a distance between the second lens group and the third lens group being varied. With this construction, in the variable magnification optical system according to the first embodiment of the present application, it is possible to realize zooming from the wide-angle end state to the telephoto end state and suppress respective variations of distortion, astigmatism and spherical aberration caused by zooming.

The variable magnification optical system according to the first embodiment of the present application includes a V lens group having negative refractive power which is moved so as to have a component in a direction perpendicular to the optical axis, and an F lens group having positive refractive power which is moved along the optical axis upon focusing from an infinitely distant object to a close object. In the variable magnification optical system according to the first embodiment of the present application, with the V lens group being moved so as to have a component in the direction perpendicular to the optical axis, it is possible to move an image and correct an image blur due to a camera shake, in other words, carry out vibration reduction. Also, with the above-mentioned construction, in the state that the V lens group is moved in the direction perpendicular to the optical axis, that is, in the state that the V lens group is decentered, it is possible to suppress decentering coma generated in the V lens group. Also, it is possible to suppress variation of spherical aberration and variation of astigmatism generated in each lens group upon zooming.

In the variable magnification optical system according to the first embodiment of the present application, the V lens group is disposed on the more object side than the F lens group. With this construction, the ratio of a moving amount of an image to a moving amount of the V lens group can be made larger in the telephoto end state than in the wide-angle end state. Accordingly, it is possible to suppress the moving amount of the V lens group to be needed in the telephoto end state, and suppress decentering coma generated in the V lens group. Also, with the F lens group being disposed on the more image side than the V lens group, it is possible to suppress variation of the focal length of the variable magnification optical system according to the first embodiment of the present application upon focusing thereby enabling to suppress variation in angle of view in association with focusing and achieve high optical performance.

With the above construction, it is possible to realize the compact variable magnification optical system with a high zoom ratio and high optical performance. High optical performance can be achieved upon focusing and even when the lens group is moved so as to have a component in the direction perpendicular to the optical axis.

Also, the variable magnification optical system according to the first embodiment of the present application preferably satisfies the following conditional expression (1):

$$0.240 < ff/(-fv) < 4.000 \qquad (1)$$

where ff denotes a focal length of the F lens group, and fv denotes a focal length of the V lens group.

The conditional expression (1) defines the range of the proper focal length ratio of the F lens group and the V lens group. With the variable magnification optical system according to the first embodiment of the present application satisfying the conditional expression (1), it is possible to suppress decentering coma at the time when vibration reduction is carried out by moving the V lens group so as to have the component in the direction perpendicular to the optical axis. Further, it is possible to suppress variation of spherical aberration and variation of astigmatism to be generated in each lens group upon focusing.

When the value of ff/(-fv) in the conditional expression (1) according to the variable magnification optical system according to the first embodiment of the present application is equal to or falls down the lower limit value, variation of spherical aberration and variation of astigmatism generated in each lens group upon focusing become large. Incidentally, in order to secure the effect of the present application surely, it is preferable to set the lower limit value of the conditional expression (1) to 0.490. Further, in order to secure the effect of the present application more surely, it is preferable to set the lower limit value of the conditional expression (1) to 0.630.

On the other hand, when the value of ff/(-fv) in the conditional expression (1) of the variable magnification optical system according to the first embodiment of the present application is equal to or exceeds the upper limit value, decentering coma upon conducting vibration reduction becomes large. Also, the moving amount of the F lens group upon focusing becomes large. Therefore, upon focusing, the state of light passing through the F lens group is largely changed, it becomes impossible to suppress variation of spherical aberration and variation of astigmatism generated in the F lens group. Incidentally, in order to secure the effect of the present application surely, it is preferable to set the upper limit value of the conditional expression (1) to 2.800. Further, in order to secure the effect of the present application surely, it is preferable to set the upper limit value of the conditional expression (1) to 1.800.

Further, in the variable magnification optical system according to the first embodiment of the present application, upon zooming from the wide-angle end state to the telephoto end state, it is desirable that the distance between the V lens group and the F lens group in the direction of the optical axis is made unchangeable. With this construction, the V lens group and F lens group can be disposed in a same lens group, and it is possible to easily suppress mutual tilt decentering of the V lens group and F lens group generated at the time of manufacture. Accordingly, it is possible to suppress decentering coma and astigmatism generated due to tilt decentering of the V lens group and F lens group.

Also, in the variable magnification optical system according to the first embodiment of the present application, it is desirable that a fourth lens group having negative refractive power is disposed on the image side of the third lens group and, upon zooming from the wide-angle end state to the telephoto end state, a distance between the third lens group and the fourth lens group is varied. With this construction, the position of the principal point of the lens groups from the first to third lens groups is displaced to the object side, thereby enabling to downsize the variable magnification optical system according to the first embodiment of the present application. Also, it is possible to suppress distortion in the wide-angle end state, and variation of spherical aberration and variation of astigmatism upon zooming.

Further, in the variable magnification optical system according to the first embodiment of the present application, it is desirable that a fifth lens group is disposed on the image side of the fourth lens group and, upon zooming from the wide-angle end state to the telephoto end state, a distance between the fourth lens group and the fifth lens group is varied. With this construction, it is possible to suppress distortion in the wide-angle end state, and variation of spherical aberration and variation of astigmatism upon zooming.

Further, in the variable magnification optical system according to the first embodiment of the present application, it is desirable that an R lens group is disposed on the most image side, and upon zooming from the wide-angle end state to the teleohito end state, the position of the R lens group is fixed. With this construction, upon zooming, it is possible to vary the height of marginal light flux incident on the R lens group from the optical axis, and suppress variation of astigmatism.

Also, it is preferable that the variable magnification optical system according to the first embodiment of the present application satisfies the following conditional expression (2):

$$0.280 < (-fv)/f3 < 5.200 \quad (2)$$

where f3 denotes a focal length of the third lens group, and fv denotes the focal length of the V lens group.

The conditional expression (2) defines the range of the proper focal length ratio of the third lens group and the V lens group. With the variable magnification optical system according to the first embodiment of the present application satisfying the conditional expression (2), it is possible to suppress decentering coma at the time of carrying out vibration reduction. When the value of (−fv)/f3 in the conditional expression (2) according to the variable magnification optical system according to the first embodiment of the present application is equal to or falls down the lower limit value, decentering coma at the time of carrying out vibration reduction becomes large. Incidentally, in order to secure the effect of the present application surely, it is preferable to set the lower limit value of the conditional expression (2) to 0.610. Further, in order to secure the effect of the present application surely, it is preferable to set the lower limit value of the conditional expression (2) to 0.740.

On the other hand, when the value of (−fv)/f3 in the conditional expression (2) of the variable magnification optical system according to the first embodiment of the present application is equal to or exceeds the upper limit value, the moving amount of the V lens group needed at the time of carrying out vibration reduction becomes large. Accordingly, decentering coma generated by the V lens group becomes large. Incidentally, in order to secure the effect of the present application surely, it is preferable to set the upper limit value of the conditional expression (2) to 2.400. Further, in order to secure the effect of the present application surely, it is preferable to set the upper limit value of the conditional expression (2) to 1.650.

Also, in the variable magnification optical system according to the first embodiment of the present application, it is desirable that the third lens group includes the V lens group. That is, with the V lens group constituting a portion of the third lens group, it is possible to suppress the moving amount of the V lens group needed at the time of carrying out vibration reduction, and suppress decentering coma generated by the V lens group. Also, it is possible to easily suppress mutual tilt decentering of the third lens group and the V lens group generated at the time of manufacture, and suppress decentering coma and astigmatism generated due to tilt decentering of the V lens group.

Further, in the variable magnification optical system according to the first embodiment of the present application, it is desirable that the third lens group includes a 3A lens group having positive refractive power on the object side of the V lens group. With this construction, it is possible to suppress the moving amount of the V lens group needed at the time of carrying out vibration reduction and suppress decentering coma generated by the V lens group.

Further, it is preferable that the variable magnification optical system according to the first embodiment of the present application satisfies the following conditional expression (3):

$$0.300 < (-fv)/f3A < 3.800 \quad (3)$$

where f3A denotes a focal length of the 3A lens group, and fv denotes the focal length of the V lens group.

The conditional expression (3) defines the range of the proper focal length ratio of the 3A lens group and the V lens group. With the variable magnification optical system according to the first embodiment of the present application satisfying the conditional expression (3), it is possible to suppress decentering coma at the time of carrying out vibration reduction.

When the value of (−fv)/f3A of the conditional expression (3) in the variable magnification optical system according to the first embodiment of the present application is equal to or falls down the lower limit value, decentering coma at the time of carrying out vibration reduction becomes large. Incidentally, in order to secure the effect of the present application surely, it is preferable to set the lower limit value of the conditional expression (3) to 0.650. Further, in order to secure the effect of the present application surely, it is preferable to set the lower limit value of the conditional expression (3) to 0.920.

On the other hand, when the value of (−fv)/f3A in the conditional expression (3) of the variable magnification optical system according to the first embodiment of the present application is equal to or exceeds the upper limit value, the moving amount of the V lens group needed at the time of carrying out vibration reduction becomes large. Accordingly, decentering coma generated by the V lens group becomes large. Incidentally, in order to secure the effect of the present application surely, it is preferable to set the upper limit value of the conditional expression (3) to 3.700. Further, in order to secure the effect of the present application surely, it is preferable to set the upper limit value of the conditional expression (3) to 2.900.

Also, in the variable magnification optical system according to the first embodiment of the present application, it is desirable that, upon zooming from the wide-angle end state to the telephoto end state, a distance between the 3A lens group and the V lens group is made unchangeable. With this construction, it is possible to suppress, upon zooming, change of mutual tilt decentering of the third lens group and the V lens group generated at the time of manufacture. Therefore, it is possible to suppress variation of decentering coma and variation of inclination of astigmatism generated due to tilt decentering of the V lens group upon zooming.

Also, it is desirable that the variable magnification optical system according to the first embodiment of the present application satisfies the following conditional expression (4):

$$0.320 < ff/f3 < 5.200 \quad (4)$$

where f3 denotes the focal length of the third lens group, and ff denotes the focal length of the F lens group.

The conditional expression (4) defines the range of the proper focal length ratio of the third lens group and the F lens group. With the variable magnification optical system according to the first embodiment of the present application satisfying the conditional expression (4), it is possible to suppress variation of spherical aberration and variation of astigmatism generated by the F lens group upon focusing.

When the value of ff/f3 in the conditional expression (4) according to the variable magnification optical system according to the first embodiment of the present application is equal to or falls down the lower limit value, variation of spherical aberration and variation of astigmatism generated by the F lens group upon focusing becomes large. Incidentally, in order to secure the effect of the present application surely, it is preferable to set the lower limit value of the conditional expression (4) to 0.880. Further, in order to secure the effect of the present application surely, it is preferable to set the lower limit value of the conditional expression (4) to 1.150.

On the other hand, when the value of ff/f3 in the conditional expression (4) of the variable magnification optical system according to the first embodiment of the present application is equal to or exceeds the upper limit value, the moving amount of the F lens group upon focusing becomes large. Accordingly, heights of on-axis light rays and off-axis light rays incident on the F lens group from the optical axis upon focusing are largely varied, so that variation of spherical aberration and variation of astigmatism generated by the F lens group become large. Incidentally, in order to secure the effect of the present application surely, it is preferable to set the upper limit value of the conditional expression (4) to 2.600. Further, in order to secure the effect of the present application surely, it is preferable to set the upper limit value of the conditional expression (4) to 1.900.

Further, in the variable magnification optical system according to the first embodiment of the present application, it is desirable that the third lens group includes the F lens group. That is, with the F lens group constituting a portion of the third lens group, it is possible to easily suppress mutual tilt decentering of the third lens group and the F lens group generated at the time of manufacture, and suppress decentering coma and astigmatism generated due to tilt decentering of the F lens group.

Further, in the variable magnification optical system according to the first embodiment of the present application, it is desirable that the F lens group is disposed on the most image side of the third lens group. With this construction, it is possible to suppress variation of the focal length of the variable magnification optical system of the present application upon focusing, and suppress variation of an angle of view upon focusing, enabling to achieve high optical performance. Also, it is possible to suppress the moving amount of the F lens group upon focusing in the telephoto end state. Therefore, it is possible not only to downsize the variable magnification optical system according to the first embodiment of the present application but also to suppress variation of astigmatism and variation of distortion upon focusing.

Further, in the variable magnification optical system according to the first embodiment of the present application, it is desirable that an M lens group having positive refractive power is disposed between the V lens group and the F lens group. With this construction, it is possible to suppress decentering coma generated by the V lens group in the state that the V lens group is moved to have the component in the direction perpendicular to the optical axis at the time of carrying out vibration reduction. Also, it is possible to suppress the moving amount of the F lens group upon focusing. Therefore, it is possible to suppress variation of astigmatism and variation of spherical aberration generated by the F lens group upon focusing.

Further, it is desirable that the variable magnification optical system according to the first embodiment of the present application satisfies the following conditional expression (5):

$$0.110 < (-fv)/fm < 2.600 \qquad (5)$$

where fv denotes the focal length of the V lens group, and fm denotes a focal length of the M lens group.

The conditional expression (5) defines the range of the proper focal length ratio of the V lens group and the F lens group. With the variable magnification optical system according to the first embodiment of the present application satisfying the conditional expression (5), it is possible to suppress decentering coma generated by the V lens group in the state that the V lens group is moved to have the component in the direction perpendicular to the optical axis at the time of carrying out vibration reduction. Also, it is possible to supress variation of astigmatism and variation of spherical aberration generated by the F lens group upon focusing.

When the value of $(-fv)/fm$ in the conditional expression (5) according to the variable magnification optical system according to the first embodiment of the present application is equal to or falls down the lower limit value, decentering coma generated by the V lens group in the state that the V lens group is moved to have the component in the direction perpendicular to the optical axis at the time of carrying out vibration reduction becomes large. Also, the moving amount of the F lens group upon focusing becomes large. Accordingly, it becomes difficult to suppress variation of astigmatism and variation of spherical aberration generated in the F lens group upon focusing. Incidentally, in order to secure the effect of the present application surely, it is preferable to set the lower limit value of the conditional expression (5) to 0.230.

On the other hand, when the value of $(-fv)/fm$ in the conditional expression (5) of the variable magnification optical system according to the first embodiment of the present application is equal to or exceeds the upper limit value, the moving amount of the V lens group needed at the time of carrying out vibration reduction becomes large. Accordingly, decentering coma generated by the V lens group becomes large. Also, it becomes difficult to suppress variation of astigmatism and variation of spherical aberration generated in the F lens group upon focusing. Incidentally, in order to secure the effect of the present application surely, it is preferable to set the upper limit value of the conditional expression (5) to 1.300. Further, in order to secure the effect of the present application surely, it is preferable to set the upper limit value of the conditional expression (5) to 0.880.

Further, it is desirable that the variable magnification optical system according to the first embodiment of the present application satisfies the following conditional expression (6):

$$0.080 < ff/fm < 1.700 \qquad (6)$$

where ff denotes the focal length of the F lens group, and fm denotes the focal length of the M lens group.

The conditional expression (6) defines the range of the proper focal length ratio of the F lens group and the M lens group. With the variable magnification optical system according to the first embodiment of the present application satisfying the conditional expression (6), it is possible to suppress variation of astigmatism and variation of spherical aberration generated in the F lens group upon focusing.

When the value of ff/fm in the conditional expression (6) according to the variable magnification optical system according to the first embodiment of the present application is equal to or falls down the lower limit value, variation of astigmatism and variation of spherical aberration generated in the F lens group upon focusing become large.

Incidentally, in order to secure the effect of the present application surely, it is preferable to set the lower limit value of the conditional expression (6) to 0.200.

On the other hand, when the value of ff/fm in the conditional expression (6) of the variable magnification optical system according to the first embodiment of the present application is equal to or exceeds the upper limit value, the moving amount of the F lens group upon focusing becomes large. Accordingly, on-axis light rays and off-axis light rays incident on the F lens group upon focusing are largely varied, so that variation of astigmatism and variation of spherical aberration become large. Incidentally, in order to secure the effect of the present application surely, it is preferable to set the upper limit value of the conditional expression (6) to 1.200. Further, in order to secure the effect of the present application surely, it is preferable to set the upper limit value of the conditional expression (6) to 0.950.

Further, in the variable magnification optical system according to the first embodiment of the present application, it is desirable that, upon zooming from the wide-angle end state to the telephoto end state, the distance between the first lens group and the second lens group increases. With this construction, it is possible to increase the magnification of the second lens group and suppress variation of spherical aberration and variation of astigmatism upon zooming while effectively realizing a high zoom ratio.

Further, in the variable magnification optical system according to the first embodiment of the present application, it is desirable that the distance between the second lens group and the third lens group decreases. With this construction, it is possible to increase the composite magnification from the third lens group to the lens group located on the most image side, and suppress variation of spherical aberration and variation of astigmatism upon zooming while effectively realizing a high zoom ratio.

Further, in the variable magnification optical system according to the first embodiment of the present application, it is desirable that, upon zooming from the wide-angle end state to the telephoto end state, the first lens group is moved to the object side. With this construction, it is possible to suppress variation of the height of off-axis rays passing through the first lens group from the optical axis, reduce the diameter of the first lens, and suppress variation of astigmatism upon zooming.

Further, in the variable magnification optical system according to the first embodiment of the present application, it is desirable that, upon zooming from the wide-angle end state to the telephoto end state, the third lens group is moved to the object side. With this construction, it is possible to increase the magnification of the third lens group, and suppress variation of spherical aberration and variation of astigmatism generated in the third lens group upon zooming.

Further, in the variable magnification optical system according to the first embodiment of the present application, it is desirable that, upon zooming from the wide-angle end state to the telephoto end state, the second lens group is moved along the optical axis. With this construction, upon zooming, it is possible to suppress variation of astigmatism generated by the first lens group and the third lens group especially in the intermediate focal length state.

Further, in the variable magnification optical system according to the first embodiment of the present application, it is desirable that the second lens group includes, in order from the object side, a first lens having negative refractive power, a second lens having positive refractive power, and a third lens having negative refractive power. With this construction, it is possible to suppress respective variations of coma, spherical aberration and astigmatism generated in the second lens group upon zooming. Also, as compared with composing the second lens group with four or more lenses, it is possible to reduce the thickness of the second lens group, and suppress the height of off-axis rays in the first lens group from the optical axis in the wide-angle end state thereby to enable downsizing of the first lens group.

Further, in the variable magnification optical system according to the first embodiment of the present application, it is desirable that the second lens and the third lens are cemented together. With this construction, it is possible to suppress variation of coma generated in the second lens upon zooming.

Further, in the variable magnification optical system according to the first embodiment of the present application, it is desirable that the object side lens surface of the first lens and the image side surface of the third lens are aspherical surfaces. With this construction, it is possible to suppress respective variations of astigmatism, coma and distortion upon zooming.

An optical apparatus of the present application is equipped with the above-constructed variable magnification optical system according to the first embodiment. Accordingly, it is possible to realize the compact optical apparatus with a high zoom ratio and high optical performance. High optical performance can be achieved upon focusing and even when the lens group is moved to have the component in the direction perpendicular to the optical axis.

A method for manufacturing for the variable magnification optical system according to the first embodiment of the present application, is a method for manufacturing a variable magnification optical system which comprises from an object side: a first lens group having positive refractive power; a second lens group having negative refractive power; a the third lens group having positive refractive power; the method comprising the steps of: disposing a V lens group that has negative refractive power and that is moved so as to have the component in the direction perpendicular to the optical axis, and an F lens group that has positive refractive power and that is moved along the optical axis upon focusing from an infinitely distant object to a close object; disposing the V lens group on a more object side than the F lens group; and constructing such that, upon zooming from a wide-angle end state to a telephoto end state, a distance between the first lens group and the second lens group, and a distance between the second lens group and the third lens group are varied. Accordingly, it is possible to realize the compact variable magnification optical system with a high zoom ratio and high optical performance. High optical performance can be achieved upon focusing and even when the lens group is moved to have the component in the direction perpendicular to the optical axis.

Hereinafter, a variable magnification optical according to a second embodiment of the present application, an optical apparatus and a method for manufacturing the variable magnification optical system will be explained.

The variable magnification optical system according to the second embodiment of the present application comprises: in order from an object side: a first lens group having positive refractive power; a second lens group having negative refractive power; and a third lens group having positive refractive power; upon zooming from a wide-angle end state to a telephoto end state, a distance between the first lens group and the second lens group being varied, and a distance between the second lens group and the third lens group being varied. With this construction, in the variable magnification optical system according to the second embodiment of the present application, it is possible to realize zooming from the wide-angle end state to the telephoto end state and suppress variations of distortion, astigmatism and spherical aberration upon zooming.

Further, in the variable magnification optical system according to the second embodiment of the present application, the third lens group includes an F lens group having positive refractive power which is moved along the optical axis upon focusing from an infinitely distant object to a close object. With this construction, it is possible to suppress variation of astigmatism and variation of spherical aberration upon focusing. Also, it is possible to suppress variation of the focal length of the variable magnification optical system according to the second embodiment of the present application, and suppress variation of the angle of view upon focusing, enabling to realize high optical performance. Also, in the telephoto end state, it is possible to suppress the moving amount of the F lens group upon focusing. Accordingly, it is possible not only to downsize the variable magnification optical system according to the second embodiment of the present application but also to suppress variation of astigmatism and variation of distortion upon focusing.

With the above construction, it is possible to realize the compact variable magnification optical system with a high zoom ratio and high optical performance. High optical performance can be achieved even upon focusing.

Further, it is desirable that the variable magnification optical system according to the second embodiment of the present application satisfies the following conditional expression (4):

$$0.320 < ff/f3 < 5.200 \qquad (4)$$

where f3 denotes a focal length of the third lens group, and ff denotes a focal length of the F lens group.

The conditional expression (4) defines the range of the proper focal length ratio of the third lens group and the F lens group. With the variable magnification optical system according to the second embodiment of the present application satisfying the conditional expression (4), it is possible to suppress variation of spherical aberration and variation of astigmatism generated by the F lens group upon focusing.

When the value of ff/f3 in the conditional expression (4) according to the variable magnification optical system according to the second embodiment of the present application is equal to or falls down the lower limit value, variation of spherical aberration and variation of astigmatism generated by the F lens group upon focusing becomes large. Incidentally, in order to secure the effect of the present application surely, it is preferable to set the lower limit value of the conditional expression (4) to 0.880. Further, in order to secure the effect of the present application surely, it is preferable to set the lower limit value of the conditional expression (4) to 1.150.

On the other hand, when the value of ff/f3 in the conditional expression (4) of the variable magnification optical system according to the second embodiment of the present application is equal to or exceeds the upper limit value, the moving amount of the F lens group upon focusing becomes large. Accordingly, heights of on-axis light rays and off-axis light rays incident on the F lens group from the optical axis upon focusing are largely varied, so that variation of spherical aberration and variation of astigmatism generated by the F lens group become large. Incidentally, in order to secure the effect of the present application surely, it is preferable to set the upper limit value of the conditional expression (4) to 2.600. Further, in order to secure the effect of the present application surely, it is preferable to set the upper limit value of the conditional expression (4) to 1.900.

Further, in the variable magnification optical system according to the second embodiment of the present application, it is desirable that the F lens group is a portion lens group of the third lens group. With this construction, that is, the F lens group being a portion of the third lens group, it is possible to suppress variation of the focal length of the variable magnification optical system according to the second embodiment of the present application upon focusing, and suppress variation of astigmatism and the like upon focusing.

Further, in the variable magnification optical system according to the second embodiment of the present application, it is desirable that the F lens group is disposed on the most image side of the third lens group. With this construction, it is possible to suppress variation of the focal length of the variable magnification optical system according to the second embodiment of the present application upon focusing, and suppress variation of angle of view upon focusing thereby to enable realizing high optical performance. Also, it is possible to suppress variation of astigmatism and variation of distortion upon focusing.

Further, in the variable magnification optical system according to the second embodiment of the present application, it is desirable that a fourth lens group having negative refractive power is disposed on the image side of the third lens group and, upon zooming from the wide-angle end state to the telephoto end state, a distance between the third lens group and the fourth lens group is varied. With this construction, the position of the principal point of the lens groups from the first to the third lens groups is displaced to the object side, so that it is possible to downsize the variable magnification optical system according to the second embodiment of the present application. Also, it is possible to suppress distortion in the wide-angle end state, and suppress variation of spherical aberration and variation of astigmatism upon zooming.

Further, in the variable magnification optical system according to the second embodiment of the present application, it is desirable that a fifth lens group is disposed on the image side of the fourth lens group and, upon zooming from the wide-angle end state to the telephoto end state, a distance between the fourth lens group and fifth lens group is varied. With this construction, it is possible to suppress distortion in the wide-angle end state, and suppress variation of spherical aberration and variation of astigmatism upon zooming.

Further, in the variable magnification optical system according to the second embodiment of the present application, it is desirable that an R lens group is disposed on the most image side and, upon zooming from the wide-angle end state to the telephoto end state, the position of the R lens group is fixed. With this construction, upon zooming, the height of marginal light flux incident on the R lens from the optical axis is varied, so that it is possible to suppress variation of astigmatism.

Further, it is desirable that the variable magnification optical system according to the second embodiment of the present application satisfies the following conditional expression (7):

$$5.500 < f1/fw < 9.000 \qquad (7)$$

where fw denotes the focal length of the variable magnification optical system in the wide-angle end state, and f1 is a focal length of the first lens group.

The conditional expression (7) defines the range of the proper focal length of the first lens group. With the variable magnification optical system according to the second embodiment of the present application satisfying the conditional expression (7), it is possible to suppress variation of spherical aberration and variation of astigmatism upon zooming.

When the value of f1/fw in the conditional expression (7) according to the variable magnification optical system according to the second embodiment of the present application is equal to or falls down the lower limit value, it becomes difficult to suppress variation of spherical aberration and variation of astigmatism generated in the first lens group upon zooming, so that high optical performance cannot be achieved. Incidentally, in order to secure the effect of the present application surely, it is preferable to set the lower limit value of the conditional expression (7) to 6.700. Further, in order to secure the effect of the present application surely, it is preferable to set the lower limit value of the conditional expression (7) to 7.300.

On the other hand, when the value of f1/fw in the conditional expression (7) of the variable magnification optical system according to the second embodiment of the present application is equal to or exceeds the upper limit value, it is necessary to increase the amount of change of the distance between the first lens group and the second lens group upon zooming in order to obtain a predetermined zoom ratio. Accordingly, it become difficult to downsize the variable magnification optical system according to the second embodiment of the present application and the ratio of the diameter of on-axis light rays incident on the first lens group and the diameter of on-axis light rays incident on the second lens group is varied largely upon zooming. Accordingly, variation of spherical aberration upon zooming becomes large, so that high optical performance cannot be realized. Incidentally, in order to secure the effect of the present application surely, it is preferable to set the upper limit value of the conditional expression (7) to 8.500. Further, in order to secure the effect of the present application surely, it is preferable to set the upper limit value of the conditional expression (7) to 8.200.

Further, in the variable magnification optical system according to the second embodiment of the present application, it is desirable that the third lens group includes a V lens having negative refractive power which is moved so as to have a component in a direction perpendicular to the optical axis. In the variable magnification optical system according to the second embodiment of the present application, with the V lens group being moved to have the component in the direction perpendicular to the optical axis, it is possible to move an image and correct an image blur due to a camera shake, in other words, carry out vibration reduction. Also, with the above-mentioned construction, it is possible to suppress decentering coma generated in the V lens group.

Further, in the variable magnification optical system according to the second embodiment of the present application, it is desirable that the V lens group is disposed on the more object side than the F lens group. With this construction, the ratio of the moving amount of an image to the moving amount of the V lens group can be made large in the telephoto end state rather than in the wide-angle end state. Accordingly, it is possible to suppress the moving amount of the V lens group to be needed in the telephoto end state, and suppress decentering coma generated in the V lens group.

Further, it is desirable that the variable magnification optical system according to the second embodiment of the present application satisfies the following conditional expression (1):

$$0.240 < ff/(-fv) < 4.000 \qquad (1)$$

where ff denotes a focal length of the F lens group, and fv denotes a focal length of the V lens group.

The conditional expression (1) defines the range of the proper focal length ratio of the F lens group and the V lens group. With the variable magnification optical system according to the second embodiment of the present application satisfying the conditional expression (1), it is possible to suppress decentering coma at the time when vibration reduction is carried out by moving the V lens group in the direction perpendicular to the optical axis. Also, it is possible to suppress variation of spherical aberration and variation of astigmatism to be generated in each lens group upon focusing.

When the value of ff/(-fv) in the conditional expression (1) according to the variable magnification optical system according to the second embodiment of the present application is equal to or falls down the lower limit value, variation of spherical aberration and variation of astigmatism generated in each lens group upon focusing become large. Incidentally, in order to secure the effect of the present application surely, it is preferable to set the lower limit value of the conditional expression (1) to 0.490. Further, in order to secure the effect of the present application surely, it is preferable to set the lower limit value of the conditional expression (1) to 0.630.

On the other hand, the value of ff/(-fv) in the conditional expression (1) of the variable magnification optical system according to the second embodiment of the present application is equal to or exceeds the upper limit value, decentering coma upon conducting vibration reduction becomes large. Also, the moving amount of the F lens group upon focusing becomes large. Therefore, upon focusing, the state of light passing through the F lens group is largely changed, and it becomes impossible to suppress variation of spherical aberration and variation of astigmatism generated in the F lens group. Incidentally, in order to secure the effect of the present application surely, it is preferable to set the upper limit value of the conditional expression (1) to 2.800. Further, in order to secure the effect of the present application surely, it is preferable to set the upper limit value of the conditional expression (1) to 1.800.

Further, it is desirable that the variable magnification optical system according to the second embodiment of the present application satisfies the following conditional expression (2):

$$0.280 < (-fv)/f3 < 5.200 \qquad (2)$$

where f3 denotes a focal length of the third lens group, and fv denotes the focal length of the V lens group.

The conditional expression (2) defines the range of the proper focal length ratio of the third lens group and the V lens group. With the variable magnification optical system according to the second embodiment of the present application satisfying the conditional expression (2), it is possible to suppress decentering coma at the time of carrying out vibration reduction.

When the value of (−fv)/f3 in the conditional expression (2) according to the variable magnification optical system according to the second embodiment of the present application is equal to or falls down the lower limit value, decentering coma at the time of carrying out vibration reduction becomes large. Incidentally, in order to secure the effect of the present application surely, it is preferable to set the lower limit value of the conditional expression (2) to 0.610. Further, in order to secure the effect of the present application surely, it is preferable to set the lower limit value of the conditional expression (2) to 0.740.

On the other hand, the value of (−fv)/f3 in the conditional expression (2) of the variable magnification optical system according to the first embodiment of the present application is equal to or exceeds the upper limit value, the moving amount of the V lens group needed at the time of carrying out vibration reduction becomes large. Accordingly, decentering coma generated by the V lens group becomes large. Incidentally, in order to secure the effect of the present application surely, it is preferable to set the upper limit value of the conditional expression (2) to 2.400. Further, in order to secure the effect of the present application surely, it is preferable to set the upper limit value of the conditional expression (2) to 1.650.

Further, in the variable magnification optical system according to the second embodiment of the present application, it is desirable that the third lens group includes a 3A lens group having positive refractive power on the object side of the V lens group. With this construction, it is possible to suppress the moving amount of the V lens group to be needed at the time of carrying out vibration reduction and suppress decentering coma generated by the V lens group.

Further, it is desirable that the variable magnification optical system according to the second embodiment of the present application satisfies the following conditional expression (3):

$$0.300 < (-fv)/f3A < 3.800 \quad (3)$$

where f3A denotes a focal length of the 3A lens group, and fv denotes the focal length of the V lens group.

The conditional expression (3) defines the range of the proper focal length ratio of the 3A lens group and the V lens group. With the variable magnification optical system according to the second embodiment of the present application satisfying the conditional expression (3), it is possible to suppress decentering coma at the time of carrying out vibration reduction.

When the value of (−fv)/f3A in the expression (3) according to the variable magnification optical system according to the second embodiment of the present application is equal to or falls down the lower limit value, decentering coma at the time of carrying out vibration reduction becomes large. Incidentally, in order to secure the effect of the present application surely, it is preferable to set the lower limit value of the conditional expression (3) to 0.650. Further, in order to secure the effect of the present application surely, it is preferable to set the lower limit value of the conditional expression (3) to 0.920.

On the other hand, the value of (−fv)/f3A in the conditional expression (3) of the variable magnification optical system according to the second embodiment of the present application is equal to or exceeds the upper limit value, the moving amount of the V lens group needed at the time of carrying out vibration reduction becomes large. Accordingly, decentering coma generated by the V lens group becomes large. Incidentally, in order to secure the effect of the present application surely, it is preferable to set the upper limit value of the conditional expression (3) to 3.700. Further, in order to secure the effect of the present application surely, it is preferable to set the upper limit value of the conditional expression (3) to 2.900.

Further, in the variable magnification optical system according to the second embodiment of the present application, it is desirable that, upon zooming from the wide-angle end state to the telephoto end state, a distance between the 3A lens group and the V lens group is made unchangeable. With this construction, it is possible to suppress, upon zooming, change of mutual tilt decentering of the third lens group and the V lens group generated at the time of manufacture. Therefore, it is possible to suppress variation of decentering coma and variation of inclination of astigmatism generated due to tilt decentering of the V lens group upon zooming.

Further, in the variable magnification optical system according to the second embodiment of the present application, it is desirable that the third lens group incldes an M lens group having positive refractive power between the V lens group and the F lens group. With this construction, it is possible to suppress decentering coma generated by the V lens group in the state that the V lens group is moved to have the component in the direction perpendicular to the optical axis at the time of carrying out vibration reduction. Also, it is possible to suppress the moving amount of the F lens group upon focusing. Therefore, it is possible to suppress variation of astigmatism and variation of spherical aberration generated by the F lens group upon focusing.

Further, it is desirable that the variable magnification optical system according to the second embodiment of the present application satisfies the following conditional expression (5):

$$0.110 < (-fv)/fm < 2.600 \quad (5)$$

where fm denotes a focal length of the M lens group, and fv denotes the focal length of the V lens group.

The conditional expression (5) defines the range of the proper focal length ratio of the V lens group and the F lens group. With the variable magnification optical system according to the second embodiment of the present application satisfying the conditional expression (5), it is possible to suppress decentering coma generated by the V lens group in the state that the V lens group is moved to have the component in the direction perpendicular to the optical axis at the time of carrying out vibration reduction. Also, it is possible to supress variation of astigmatism and variation of spherical aberration generated by the F lens group upon focusing.

When the value of (−fv)/fm in the conditional expression (5) according to the variable magnification optical system according to the first embodiment of the present application is equal to or falls down the lower limit value, decentering coma generated by the V lens group in the state that the V lens group is moved to have the component in the direction perpendicular to the optical axis at the time of carrying out vibration reduction becomes large. Also, the moving amount of the F lens group upon focusing becomes large. Accordingly, it becomes difficult to suppress variation of astigmatism and variation of spherical aberration generated in the F lens group upon focusing. Incidentally, in order to secure the effect of the present application surely, it is preferable to set the lower limit value of the conditional expression (5) to 0.230.

On the other hand, the value of (−fv)/fm in the conditional expression (5) of the variable magnification optical system according to the first embodiment of the present application is equal to or exceeds the upper limit value, the moving amount of the V lens group needed at the time of carrying out vibration reduction becomes large. Accordingly, decentering coma generated by the V lens group becomes large. Also, it becomes difficult to suppress variation of astigmatism and variation of spherical aberration generated in the F lens group upon focusing. Incidentally, in order to secure the effect of the present application surely, it is preferable to set the upper limit value of the conditional expression (5) to 1.300. Further, in order to secure the effect of the present application surely, it is preferable to set the upper limit value of the conditional expression (5) to 0.880.

Further, it is desirable that the variable magnification optical system according to the second embodiment of the present application satisfies the following conditional expression (6):

$$0.080 < f\!f/fm < 1.700 \tag{6}$$

where ff denotes the focal length of the F lens group, and fm denotes the focal length of the M lens group.

The conditional expression (6) defines the range of the proper focal length ratio of the F lens group and the M lens group. With the variable magnification optical system according to the second embodiment of the present application satisfying the conditional expression (6), it is possible to suppress variation of astigmatism and variation of spherical aberration generated in the F lens group upon focusing.

When the value of ff/fm in the conditional expression (6) according to the variable magnification optical system according to the second embodiment of the present application is equal to or falls down the lower limit value, variation of astigmatism and variation of spherical aberration generated in the F lens group upon focusing become large. Incidentally, in order to secure the effect of the present application surely, it is preferable to set the lower limit value of the conditional expression (6) to 0.200.

On the other hand, when the value of ff/fm in the conditional expression (6) of the variable magnification optical system according to the second embodiment of the present application is equal to or exceeds the upper limit value, the moving amount of the F lens group upon focusing becomes large. Accordingly, on-axis light rays and off-axis light rays incident on the F lens group upon focusing are largely varied, so that variation of astigmatism and variation of spherical aberration become large. Incidentally, in order to secure the effect of the present application surely, it is preferable to set the upper limit value of the conditional expression (6) to 1.200. Further, in order to secure the effect of the present application surely, it is more preferable to set the upper limit value of the conditional expression (6) to 0.950.

Further, in the variable magnification optical system according to the second embodiment of the present application, it is desirable that, upon zooming from the wide-angle end state to the telephoto end state, the distance between the first lens group and the second lens group increases. With this construction, it is possible to increase the magnification of the second lens group and suppress variation of spherical aberration and variation of astigmatism upon zooming while effectively realizing a high zoom ratio.

Further, in the variable magnification optical system according to the second embodiment of the present application, it is desirable that the distance between the second lens group and the third lens group decreases. With this construction, it is possible to increase the composite magnification from the third lens group to the lens group located on the most image side, and suppress variation of spherical aberration and variation of astigmatism upon zooming while effectively realizing a high zoom ratio.

Further, in the variable magnification optical system according to the second embodiment of the present application, it is desirable that, upon zooming from the wide-angle end state to the telephoto end state, the first lens group is moved to the object side. With this construction, it is possible to suppress variation of the height of off-axis rays passing through the first lens group from the optical axis, reduce the diameter of the first lens, and suppress variation of astigmatism upon zooming.

Further, in the variable magnification optical system according to the second embodiment of the present application, it is desirable that, upon zooming from the wide-angle end state to the telephoto end state, the third lens group is moved to the object side. With this construction, it is possible to increase the magnification of the third lens group, and suppress variation of spherical aberration and variation of astigmatism generated in the third lens group upon zooming.

Further, in the variable magnification optical system according to the second embodiment of the present application, it is desirable that, upon zooming from the wide-angle end state to the telephoto end state, the second lens group is moved along the optical axis. With this construction, upon zooming, it is possible to suppress variation of astigmatism generated by the first lens group and the third lens group especially in the intermediate focal length state.

Further, in the variable magnification optical system according to the second embodiment of the present application, it is desirable that the second lens group includes, in order from the object side, a first lens having negative refractive power, a second lens having positive refractive power, and a third lens having negative refractive power. With this construction, it is possible to suppress respective variations of coma, spherical aberration and astigmatism generated in the second lens group upon zooming. Also, as compared with composing the second lens group with four or more lenses, it is possible to reduce the thickness of the second lens group, and suppress the height of off-axis light rays in the first lens group from the optical axis in the wide-angle end state thereby to enable downsizing of the first lens group.

Further, in the variable magnification optical system according to the second embodiment of the present application, it is desirable that the second lens and the third lens are cemented together. With this construction, it is possible to suppress variation of coma generated in the second lens upon zooming.

Further, in the variable magnification optical system according to the second embodiment of the present application, it is desirable that an object side lens surface of the first lens and an image side surface of the third lens are aspherical surfaces. With this construction, it is possible to suppress respective variations of astigmatism, coma and distortion upon zooming.

An optical apparatus of the present application is equipped with the above-constructed variable magnification optical system according to the second embodiment. Accordingly, it is possible to realize the compact optical apparatus with a high zoom ratio and high optical performance.

High optical performance can be achieved even upon focusing.

A method for manufacturing for the variable magnification optical system according to the second embodiment of the present application, is a method for manufacturing a variable magnification optical system which comprises from an object side: a first lens group having positive refractive power; a second lens group having negative refractive power; and a third lens group having positive refractive power; the method comprising the steps of: constructing the third lens group to include an F lens group having positive refractive power and being moved along the optical axis upon focusing from an infinitely distant object to a close object; and constructing such that, upon zooming from a wide-angle end state to a telephoto end state, a distance between the first lens group and the second lens group and a distance between the second lens group and the third lens group are varied. Accordingly, it is possible to manufacture the compact variable magnification optical system with a high zoom ratio and high optical performance. High optical performance can be achieved even upon focusing.

Hereinafter, a variable magnification optical system according to a third embodiment of the present application, an optical apparatus therewith and a method for manufacturing the variable magnification optical system will be explained.

The variable magnification optical system according to the third embodiment of the present application comprises: in order from an object side: a first lens group having positive refractive power; a second lens group having negative refractive power; a third lens group having positive refractive power; a fourth lens group having negative refractive power; and fifth lens group having positive refractive power, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied. With this construction, in the variable magnification optical system according to the third embodiment of the present application, it is possible to realize zooming from the wide-angle end state to the telephoto end state and suppress respective variations of distortion, astigmatism and spherical aberration upon zooming.

Further, in the variable magnification optical system according to the third embodiment of the present application, upon zooming from the wide-angle end state to the telephoto end state, the first lens group is moved along the optical axis. With this construction, it is possible to suppress variation of the height of off-axis light rays passing through the first lens group from the optical axis upon zooming. Accordingly, it is possible to reduce the diameter of the first lens group and suppress variation of astigmatism upon zooming.

Further, in the variable magnification optical system according to the third embodiment of the present application, upon zooming from the wide-angle end state to the telephoto end state, the position of the fifth lens group is fixed. With this construction, it is possible to vary a height of marginal light rays incident on the fifth lens group from the fourth lens group upon zooming. Accordingly, it is possible to suppress well variation of astigmatism upon zooming.

Further, the variable magnification optical system according to the third embodiment of the present application satisfies the following conditional expression (8):

$$0.170 < (-f4)/f5 < 0.400 \quad (8)$$

where f4 denotes a focal length of the fourth lens group, and f5 denotes a focal length of the fifth lens group.

The conditional expression (8) defines the range of the proper focal length ratio of the fourth lens group and the fifth lens group. With the variable magnification optical system according to the third embodiment of the present application satisfying the conditional expression (8), it is possible to suppress variations of astigmatism and distortion upon zooming.

When the value of $(-f4)/f5$ in the conditional expression (8) according to the variable magnification optical system according to the third embodiment of the present application is equal to or falls down the lower limit value, it becomes difficult to suppress variations of astigmatism and distortion generated in the fourth lens group upon zooming with the fifth lens group, so that high optical performance cannot be achieved. Incidentally, in order to secure the effect of the present application surely, it is preferable to set the lower limit value of the conditional expression (8) to 0.215.

On the other hand, when the value of $(-f4)/f5$ in the conditional expression (8) of the variable magnification optical system according to the third embodiment of the present application is equal to or exceeds the upper limit value, it becomes difficult to suppress variation of astigmatism generated in the fifth lens group upon zooming, so that high optical performance cannot be achieved. Incidentally, in order to secure the effect of the present application surely, it is preferable to set the upper limit value of the conditional expression (8) to 0.300. Further, in order to secure the effect of the present application surely, it is preferable to set the upper limit value of the conditional expression (8) to 0.280.

With this construction, it is possible to achieve the compact variable magnification optical system with a high zoom ratio and high optical performance.

Further, in the variable magnification optical system according to the third embodiment of the present application, it is desirable that, upon zooming from the wide-angle end state to the telephoto end state, the third lens group is moved to the object side. With this construction, it is possible to increase the magnification of the third lens group, and suppress variations of spherical aberration and astigmatism generated in the third lens group upon zooming.

Further, in the variable magnification optical system according to the third embodiment of the present application, it is desirable that, upon zooming from the wide-angle end state to the telephoto end state, the fourth lens group is moved to the object side. With this construction, it is possible to suppress variation of coma and variation of astigmatism generated in the fourth lens group upon zooming.

Further, in the variable magnification optical system according to the third embodiment of the present application, it is desirable that, upon zooming from the wide-angle end state to the telephoto end state, the first lens group is moved to the object side. With this construction, it is possible to suppress variation of the height of off-axis light rays passing through the first lens group upon zooming. Accordingly, it is possible to reduce the diameter of the first lens group, and suppress variation of astigmatism upon zooming.

Further, in the variable magnification optical system according to the third embodiment of the present application, it is desirable that, upon zooming from the wide-angle end state to the telephoto end state, the second lens group is moved along the optical axis. With this construction, upon zooming, it is possible to suppress variation of astigmatism generated by the first lens group and the third lens group especially in the intermediate focal length state.

Further, it is desirable that the variable magnification optical system according to the third embodiment of the present application satisfies the following conditional expression (7):

$$5.500 < f1/fw < 9.000 \qquad (7)$$

where fw denotes a focal length of the variable magnification optical system in the wide-angle end state, and f1 denotes a focal length of the first lens group.

The conditional expression (7) defines the range of the proper focal length of the first lens group. With the variable magnification optical system according to the third embodiment of the present application satisfying the conditional expression (7), it is possible to suppress variation of spherical aberration and variation of astigmatism upon zooming.

When the value of f1/fw in the conditional expression (7) according to the variable magnification optical system according to the third embodiment of the present application is equal to or falls down the lower limit value, it becomes difficult to suppress variation of spherical aberration and variation of astigmatism generated in the first lens group upon zooming, so that high optical performance cannot be achieved. Incidentally, in order to secure the effect of the present application surely, it is preferable to set the lower limit value of the conditional expression (7) to 6.700. Further, in order to secure the effect of the present application surely, it is preferable to set the lower limit value of the conditional expression (7) to 7.300.

On the other hand, when the value of f1/fw in the conditional expression (7) of the variable magnification optical system according to the third embodiment of the present application is equal to or exceeds the upper limit value, it is necessary to increase the amount of change of the distance between the first lens group and the second lens group upon zooming in order to obtain a predetermined zoom ratio. Accordingly, it becomes difficult to downsize the variable magnification optical system according to the third embodiment of the present application, and the ratio of the diameter of on-axis light rays incident on the first lens group and the diameter of on-axis light rays incident on the second lens group is varied largely upon zooming. Accordingly, variation of spherical aberration upon zooming becomes large, so that high optical performance cannot be realized. Incidentally, in order to secure the effect of the present application surely, it is preferable to set the upper limit value of the conditional expression (7) to 8.500. Further, in order to secure the effect of the present application surely, it is preferable to set the upper limit value of the conditional expression (7) to 8.200.

Further, it is desirable that the variable magnification optical system according to the third embodiment of the present application satisfies the following conditional expression (9):

$$10.500 < f5/fw < 30.000 \qquad (9)$$

where fw denotes the focal length of the variable magnification optical system, and f5 denotes a focal length of the fifth lens group.

The conditional expression (9) defines the range of the proper focal length of the fifth lens group. With the variable magnification optical system according to the third embodiment of the present application satisfying the conditional expression (9), it is possible to suppress variation of astigmatism and variation of distortion upon zooming.

When the value of f5/fw in the conditional expression (9) according to the third embodiment of the present application is equal to or falls down the lower limit value, it becomes difficult to suppress variation of astigmatism generated in the fifth lens group upon zooming. Also, the diameter of the fifth lens group becomes large. Incidentally, in order to secure the effect of the present application surely, it is preferable to set the lower limit value of the conditional expression (9) to 12.000.

On the other hand, when the value of f5/fw in the conditional expression (9) of the variable magnification optical system according to the third embodiment of the present application is equal to or exceeds the upper limit value, it becomes difficult to suppress variation of astigmatism and variation of distortion generated from the first lens group to the fourth lens group upon zooming with the fifth lens group. Also, the composite focal length from the first lens group to the fourth lens group becomes small. Accordingly, influence such as decentering coma and the like caused by decentering among the lenses generated from the first lens group to the fourth lens group at the time of manufacture becomes relatively large, so that it becomes difficult to realize high optical performance. Incidentally, in order to secure the effect of the present application surely, it is preferable to set the upper limit value of the conditional expression (9) to 28.000.

Further, the optical system according to the third embodiment of the present application desirably satisfies the following conditional expression (10):

$$0.150 < (d4t - d4w)/ft < 0.350 \qquad (10)$$

where ft denotes the focal length of the variable magnification optical system in the telephoto end state, d4w denotes a vertex distance between the most image side lens surface of the fourth lens group and the most object side lens surface of the fifth lens group in the wide-angle end state, and d4t denotes a vertex distance between the most image side lens surface of the fourth lens group and the most object side lens surface of the fifth lens group in the telephoto end state.

The conditional expression (10) defines a range of a proper change amount of the vertex distance between the most image side lens surface of the fourth lens group and the most object side lens surface of the fifth lens group upon zooming. With the variable magnification optical system according to the third embodiment of the present application satisfying the conditional expression (10), it is possible to suppress variation of astigmatism upon zooming.

When the value of (d4t−d4w)/ft in the conditional expression (10) according to the third embodiment of the present application is equal to or falls down the lower limit value, the focal length of each lens group from the first lens group to the third group needs to be reduced in order to secure a predetermined zoom ratio. Accordingly, it becomes difficult to suppress variation of astigmatism generated from the first lens group to the third lens group upon zooming. Incidentally, in order to secure the effect of the present application surely, it is preferable to set the lower limit value of the conditional expression (10) to 0.175. Further, in order to secure the effect of the present application surely, it is preferable to set the lower limit value of the conditional expression (10) to 0.230.

On the other hand, when the value of (d4t−d4w)/ft in the conditional expression (10) of the variable magnification optical system according to the third embodiment of the present application is equal to or exceeds the upper limit value, it becomes difficult to suppress variation of astigmatism generated in the fifth lens group upon zooming. Incidentally, in order to secure the effect of the present application surely, it is preferable to set the upper limit value of the conditional expression (10) to 0.290.

Further, in the variable magnification optical system according to the third embodiment of the present application, it is desirable that, upon zooming from the wide-angle end state to the telephoto end state, the distance between the first lens group and the second lens group increases. With this construction, it is possible to increase the magnification of the second lens group and suppress variation of spherical aberration and variation of astigmatism upon zooming while effectively realizing a high zoom ratio.

Further, in the variable magnification optical system according to the third embodiment of the present application, it is desirable that the distance between the second lens group and the third lens group decreases. With this construction, it is possible to increase the composite magnification from the third lens group to the fifth lens group, and suppress variation of spherical aberration and variation of astigmatism upon zooming while effectively realizing a high zoom ratio.

Further, in the variable magnification optical system according to the third embodiment of the present application, it is desirable that the second lens group includes, in order from the object side, a first lens having negative refractive power, a second lens having positive refractive power, and a third lens having negative refractive power. With this construction, it is possible to suppress respective variations of coma, spherical aberration and astigmatism generated in the second lens group upon zooming. Also, as compared with composing the second lens group with four or more lenses, it is possible to reduce the thickness of the second lens group, and suppress the height of off-axis rays in the first lens group from the optical axis in the wide-angle end state thereby to enable downsizing of the first lens group.

Further, in the variable magnification optical system according to the third embodiment of the present application, it is desirable that the second lens and the third lens are cemented together. With this construction, it is possible to suppress variation of coma generated in the second lens upon zooming.

Further, in the variable magnification optical system according to the third embodiment of the present application, it is desirable that an object side lens surface of the first lens and an image side surface of the third lens are aspherical surfaces. With this construction, it is possible to suppress respective variations of astigmatism, coma and distortion upon zooming.

An optical apparatus of the present application is equipped with the above-constructed variable magnification optical system according to the third embodiment. Accordingly, it is possible to realize the compact optical apparatus with a high zoom ratio and high optical performance.

High optical performance can be achieved upon focusing and even when the lens group is moved to have the component in the direction perpendicular to the optical axis.

A method for manufacturing in the variable magnification optical system according to the third embodiment of the present application, is a method for manufacturing a variable magnification optical system which comprises from an object side: a first lens group having positive refractive power; a second lens group having negative refractive power; a third lens group having positive refractive power; a fourth lens group having negative refractive power and a fifth lens group having positive refractive power; the method comprising the steps of:

constructing the fourth lens group and the fifth lens group so as to satisfy the following conditional expression (8):

$$0.170 < (-f4)/f5 < 0.400 \qquad (8)$$

where f4 denotes the focal length of the fourth lens group, and the f5 denotes the focal length of the fifth lens group; and constructing such that, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied; the first lens group is moved along the optical axis; and the position of the fifth lens group is fixed. Accordingly, it is possible to manufacture the compact variable magnification optical system with a high zoom ratio and high optical performance.

Hereinafter, a variable magnification optical system according to each numerical example of the first to third embodiments of the present application will be explained with reference to accompanying drawings. The first and second examples are common to all the first to third embodiments.

First Example

FIGS. 1A, 1B and 1C are sectional views showing a wide-angle end state, an intermediate focal length state and a telephoto end state of a variable magnification optical system according to the first example common to the first to third embodiment.

The variable magnification optical system according to the first example is composed of, in order from an object side: a first lens group G1 having positive refractive power; a second lens group G2 having negative refractive power; a third lens group G3 having positive refractive power; a fourth lens group G4 having negative refractive power; and a fifth lens group G5 having positive refractive power which is an R lens group.

The first lens group G1 consists of, in order from the object side, a cemented lens constructed by a negative meniscus lens L11 with a convex surface facing the object side cemented with a biconvex positive lens L12, and a positive meniscus lens L13 with a convex surface facing the object side.

The second lens group G2 consists of, in order from the object side, a negative meniscus lens L21 with a convex surface facing the object side which is a first lens, and a cemented lens constructed by a positive meniscus lens L22 with a concave surface facing the object side which is a second lens cemented with a negative meniscus lens L23 with a concave surface facing the object side which is a third lens. The negative meniscus lens L21 is a compound type aspherical lens whose object side glass surface is provided with a resin layer so as to be an aspherical shape. The negative meniscus lens L23 is a glass mold type aspherical lens whose image side lens surface is made to be an aspherical shape.

The third lens group G3 is composed of, in order from the object side, a 3A lens group G3A having positive refractive power, a V lens group GV having negative refractive power, an M lens group GM having positive refractive power and an F lens group GF having positive refractive power.

The 3A lens group G3A consists of, in order from the object side, a positive meniscus lens L31 with convex surface facing the object side, and a biconvex positive lens L32.

The V lens group GV consists of, in order from the object side, a cemented lens constructed by a positive meniscus lens L33 with a concave surface facing the object side cemented with a biconcave negative lens L34. The negative lens L34 is a glass mold type aspherical lens whose image side lens surface is made to be an aspherical shape.

The M lens group GM consists of, in order from the object side, a cemented lens constructed by a biconvex positive lens L35 cemented with a negative meniscus lens L36 with concave surface facing the object side and a negative meniscus lens L37 with a concave surface facing the object side. The negative meniscus lens L37 is a glass mold type aspherical lens whose image side lens surface is made to be an aspherical shape.

The F lens group GF consists of, in order from the object side, a cemented lens constructed by a negative meniscus lens L38 with convex surface facing the object side cemented with a biconvex positive lens L39.

An aperture stop S is disposed on the object side of the third lens group G3.

The fourth lens group G4 consists of, in order from the object side, a biconcave negative lens L41, a negative meniscus lens L42 with a concave surface facing the object side and a biconvex positive lens L43.

The fifth lens group G5 consists of a positive meniscus lens L51 with a concave surface facing the object side. The positive meniscus lens L51 is a glass mold type aspherical lens whose image side lens surface is made to be an aspherical shape.

With the above-mentioned construction, in the variable magnification optical system according to the present example, upon zooming from the wide-angle end state to the telephoto end state, the first to the fourth lens groups G1 to G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens G5 group are varied.

Specifically, the lens first group G1 to the fourth lens group G4 are moved to the object side upon zooming. The position of the fifth lens group G5 is fixed in a direction of the optical axis upon zooming. The aperture stop S is moved integrally with the third lens group G3 to the object side upon zooming.

Accordingly, upon zooming, the distance between the first lens group G1 and the second lens group G2 increases, the distance between the second lens group G2 and the third lens group G3 decreases, and the distance between the fourth lens group G4 and the fifth lens group G5 increases. Also, upon zooming, the distance between the third lens group G3 and the fourth lens group G4 increases from the wide-angle end state to the intermediate focal length state, and decreases from the intermediate focal length state to the telephoto end state. A distance between the 3A lens group G3A and the V lens group GV of the third lens group G3 is constant upon zooming.

Further, in the variable magnification optical system according to the present example, at the time of occurrence of a camera shake, the V lens group of the third lens group G3 is used as a vibration reduction lens group and moved so as to have a component in a direction perpendicular to the optical axis thereby to carry out vibration reduction.

Further, in the variable magnification optical system according to the present example, the F lens group of the third lens group G3 is used as a focusing lens group and moved along the optical axis to the object side thereby to carry out focusing from an infinitely distant object to a close object.

Table 1 below shows various values associated with the variable magnification optical system according to the present example.

In Table 1, f denotes a focal length, and BF denotes a back focal length, that is, denotes a distance between the most image side lens surface and the image plane I on the optical axis.

In [Surface Data] m denotes an order of an optical surface counted from the object side, r denotes a radius of curvature, d denotes a surface-to-surface distance (an interval from an n-th surface to an (n+1)-th surface, where n is an integer), nd denotes a refractive index to d-line (wavelength=587.6 nm), and νd denotes an Abbe number to d-line (wavelength=587.6). OP denotes an object surface, and I denotes the image plane. The radius of curvature r=∞ indicates a plane surface. "*" mark is attached to a surface number of each aspherical surface, and a value of each paraxial radius of curvature is listed in the column of the radius of curvature r. The refractive index of air nd=1.000000 is omitted.

[Aspherical Data] shows aspherical surface coefficients and conic constants in the case when the shape of each aspherical surface shown in [Surface Data] is expressed by the following expression:

$$x=(h^2/r)/[1+\{1-\kappa(h/r)^2\}^{1/2}]+A4h^4+A6h^6+A8h^8+A10h^{10}+A12h^{12}$$

Here, h is made to be a height vertical to the optical axis, x is made to be a sag amount being the distance between a tangent plane of the vertex of each aspherical surface in the height h to each aspherical surface along the optical axis, κ is made to be a conic constant, A4, A6, A8, A10, A12 are made to be aspherical surface coefficients, and r is made to be a paraxial radius of curvature being a radius of curvature of reference sphere. "E-n" (n is an integer) represents "×10$^{-n}$". For example, "1.234E-05" represents "1.234×10$^{-5}$". The aspherical surface coefficient A2 of second order is 0 and is omitted.

In [Various Data], FNO denotes an F number, ω denotes a half angle of view (unit is "°"), Y denotes an image height, TL denotes a total length of the variable magnification optical system, that is, the distance between a first surface and the image plane I along the optical axis upon focusing the infinitely distant object, do denotes a variable interval between an n-th surface and an (n+1)-th surface, and φ denotes the diameter of the aperture stop S. W denotes the wide-angle end state, M denotes the intermediate focal length and T denotes the telephoto end state.

[Moving Amount of Focusing Lens Group upon Focusing] shows the moving amount of the F lens group GF upon focusing (shooting magnification—0.0100 times) from the infinitely distant object to the close object. The sign of the moving amount is made to be a plus in the case where the F lens group is moved to the object side. Also, a photographing distance represents the distance between the object surface to the image plane I.

[Lens Group Data] shows a starting surface ST of each lens group and a focal length f.

[Vibration Reduction Coefficient] shows a vibration reduction coefficient that is a ratio of the moving amount of an image on the image plane I to the moving amount of the V lens group GV that is the vibration reduction lens group from the optical axis.

[Values for Conditional Expressions] shows corresponding values for conditional expressions of the variable magnification optical system according to the present application.

"mm" is used as the unit for various lengths such as the focal length f, the radius of curvature r and the like. However, even when the optical system is proportionally enlarged or proportionally reduced, the same optical performance can be obtained, so the unit is not necessarily limited to "mm".

TABLE 1

First Example

[Surface Data]

| m | r | d | nd | vd |
|---|---|---|---|---|
| OP | ∞ | | | |
| 1 | 140.5647 | 1.6350 | 1.903660 | 31.27 |
| 2 | 45.6913 | 7.6885 | 1.497820 | 82.57 |
| 3 | −284.3669 | 0.1000 | | |
| 4 | 44.8550 | 4.5326 | 1.804000 | 46.60 |
| 5 | 209.3179 | d5 | | |
| *6 | 500.0000 | 0.1000 | 1.553890 | 38.09 |
| 7 | 190.3219 | 1.0000 | 1.883000 | 40.66 |
| 8 | 8.9187 | 4.3652 | | |
| 9 | −114.5251 | 4.6494 | 1.808090 | 22.74 |
| 10 | −9.8911 | 1.0000 | 1.851350 | 40.10 |
| *11 | −141.3941 | d11 | | |
| 12 | ∞ | 1.0000 | Aperture Stop S | |
| 13 | 22.3603 | 1.7845 | 1.589130 | 61.22 |
| 14 | 187.8269 | 0.2763 | | |
| 15 | 15.7519 | 1.9659 | 1.487490 | 70.31 |
| 16 | −148.6118 | 1.8000 | | |
| 17 | −28.8021 | 2.7134 | 1.903660 | 31.27 |
| 18 | −9.8324 | 1.0000 | 1.801390 | 45.46 |
| *19 | 41.1794 | 1.8000 | | |
| 20 | 37.0997 | 2.9939 | 1.593190 | 67.90 |
| 21 | −10.2317 | 1.0000 | 2.000690 | 25.46 |
| 22 | −15.2899 | 0.1000 | | |
| 23 | −37.4207 | 1.6662 | 1.851350 | 40.10 |
| *24 | −4390.3946 | 5.9000 | | |
| 25 | 15.4513 | 1.0000 | 2.001000 | 29.14 |
| 26 | 10.6501 | 3.5906 | 1.618000 | 63.34 |
| 27 | −71.8553 | d27 | | |
| 28 | −69.6397 | 1.0000 | 1.883000 | 40.66 |
| 29 | 20.2769 | 1.8596 | | |
| 30 | −24.0135 | 1.0000 | 1.902650 | 35.73 |
| 31 | −41.9476 | 0.2011 | | |
| 32 | 29.1388 | 2.4495 | 1.698950 | 30.13 |
| 33 | −43.6887 | d33 | | |
| 34 | −46.1581 | 0.9998 | 1.583130 | 59.44 |
| *35 | −30.3822 | BF | | |
| I | ∞ | | | |

[Aspherical Data]

| m | 6 |
|---|---|
| κ | −8.90440 |
| A4 | 2.59493E−05 |
| A6 | −1.90094E−08 |
| A8 | −1.65609E−09 |
| A10 | 1.17227E−11 |
| A12 | −3.31780E−14 |
| m | 11 |
| κ | 11.00000 |
| A4 | −5.42096E−05 |
| A6 | −3.10136E−07 |
| A8 | 1.12406E−09 |
| A10 | −6.77479E−11 |
| A12 | 0.00000 |
| m | 19 |
| κ | 1.00000 |

TABLE 1-continued

First Example

| A4 | −9.95519E−06 |
|---|---|
| A6 | −1.63819E−07 |
| A8 | 7.91554E−09 |
| A10 | −7.12206E−11 |
| A12 | 0.00000 |
| m | 24 |
| κ | 1.00000 |
| A4 | 6.12158E−05 |
| A6 | 9.54377E−08 |
| A8 | 7.65997E−09 |
| A10 | −1.66332E−10 |
| A12 | 0.00000 |
| m | 35 |
| κ | 1.00000 |
| A4 | 4.40945E−05 |
| A6 | 4.55406E−08 |
| A8 | −1.64694E−10 |
| A10 | 0.00000 |
| A12 | 0.00000 |

[Various Data]
Variable magnification ratio 14.13

| | W | | T |
|---|---|---|---|
| f | 9.27 | ~ | 130.95 |
| FNO | 3.62 | ~ | 5.80 |
| ω | 42.35 | ~ | 3.34° |
| Y | 8.00 | ~ | 8.00 |
| TL | 107.68 | ~ | 161.55 |

| | W | M | T |
|---|---|---|---|
| f | 9.27006 | 35.10507 | 130.95123 |
| ω | 42.35293 | 12.26813 | 3.33615 |
| FNO | 3.62 | 4.86 | 5.80 |
| φ | 9.50 | 9.50 | 9.50 |
| d5 | 1.99992 | 27.74462 | 49.07741 |
| d11 | 26.66183 | 8.84274 | 1.60231 |
| d27 | 1.50002 | 3.35186 | 1.50007 |
| d33 | 2.49955 | 19.42198 | 34.34914 |
| BF | 13.84950 | 13.85022 | 13.85075 |

[Moving Amount of Focusing Lens Group upon Focusing]

| | W | M | T |
|---|---|---|---|
| shooting magnification | −0.0100 | −0.0100 | −0.0100 |
| photographing distance | 1012.7397 | 3564.3738 | 13007.0879 |
| moving amount | 0.0448 | 0.0946 | 0.2525 |

[Lens Group Data]

| | ST | f |
|---|---|---|
| G1 | 1 | 72.95815 |
| G2 | 6 | −9.72184 |
| G3 | 13 | 19.81920 |
| G4 | 28 | −39.80048 |
| G5 | 34 | 148.96616 |

[Vibration Reduction Coefficient]

| | W | M | T |
|---|---|---|---|
| vibration reduction coefficient | −1.25 | −1.80 | −2.16 |

[Values for Conditional Expressions]

(1) ff/(−fv) = 1.088
(2) (−fv)/f3 = 1.229
(3) (−fv)/f3A = 1.365
(4) ff/f3 = 1.337
(5) (−fv)/fm = 0.476

TABLE 1-continued

First Example (6) ff/fm = 0.518
(7) f1/fw = 7.870
(8) (−f4)/f5 = 0.267
(9) f5/fw = 16.070
(10) (d4t − d4w)/ft = 0.243

Figure 2B:
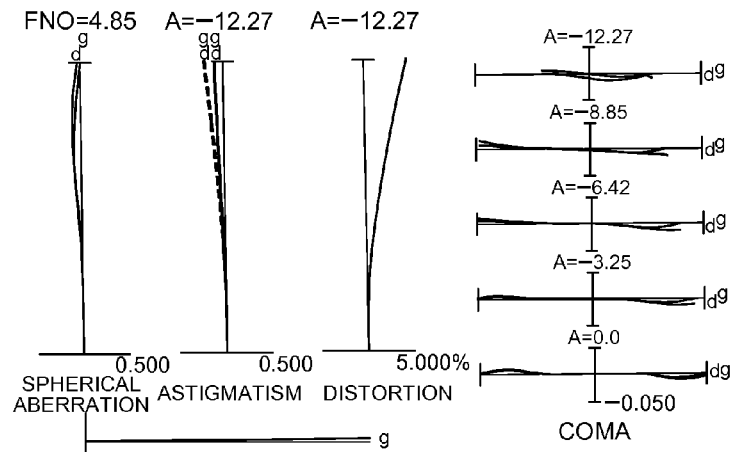
Figure 2C:
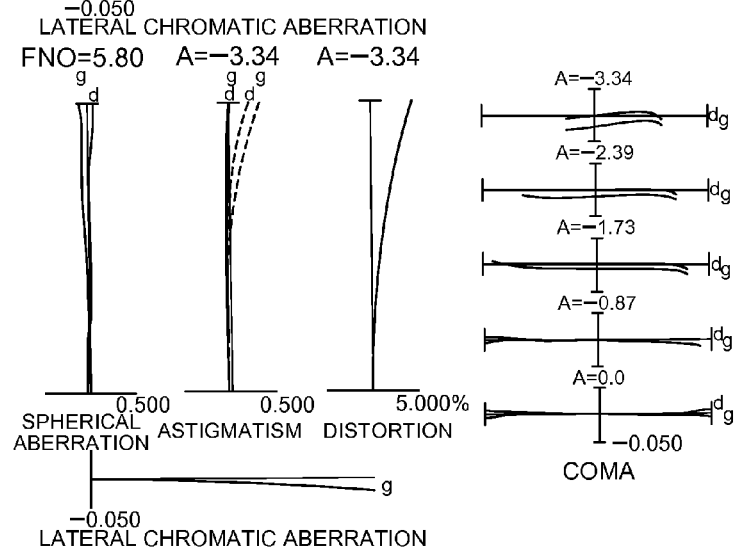

FIGS. 2A, 2B and 2C are graphs showing various aberrations upon focusing on an infinitely distant object in the wide-angle end state, in the intermediate focal length state and in the telephoto end state of the variable magnification optical system according to the first example of the present application.

Figure 3A:
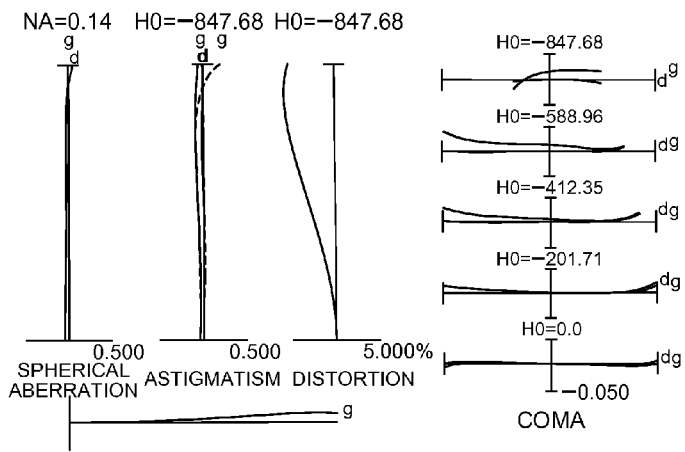
FIGS. 3A, 3B and 3C are graphs showing various aberrations upon focusing (shooting magnification—0.01 times) on the close object in the wide-angle end state, in the intermediate focal length state and in the telephoto end state of the variable magnification optical system according to the first example of the present application.
Figure 3B:
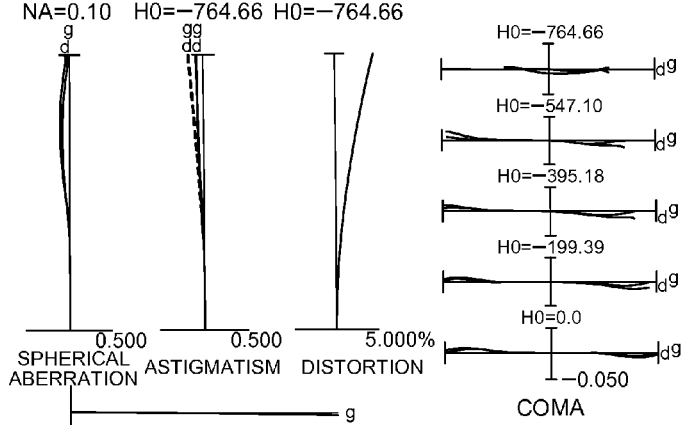
Figure 3C:
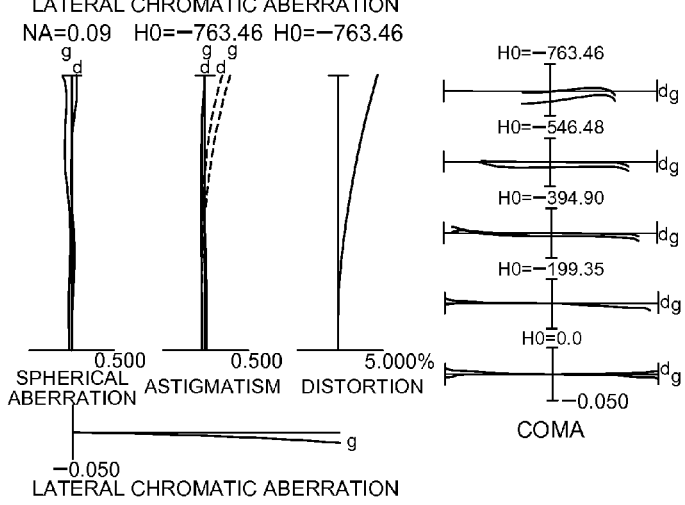

FIGS. 3A, 3B and 3C are graphs showing various aberrations upon focusing (shooting magnification—0.01 times) on the close object in the wide-angle end state, in the intermediate focal length state and in telephoto end state of the variable magnification optical system according to the first example of the present application.

Figure 4A:
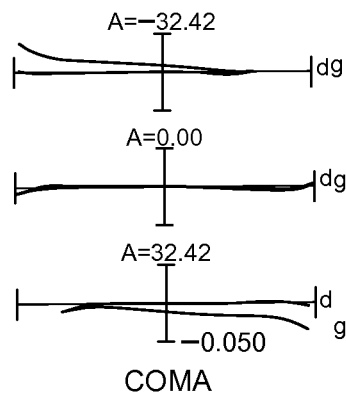
FIGS. 4A, 4B and 4C are graphs showing meridional transverse aberrations at the time of conducting vibration reduction upon focusing on the infinitely distant object in the wide-angle end state, in the intermediate focal length state and in the telephoto end state of the variable magnification optical system according to the first example of the present application.
Figure 4B:
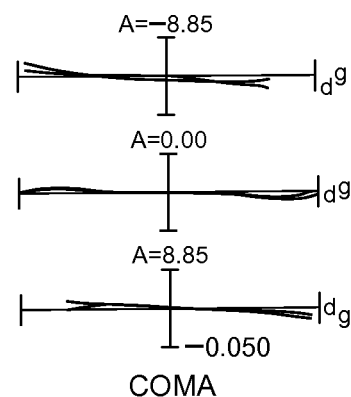
Figure 4C:
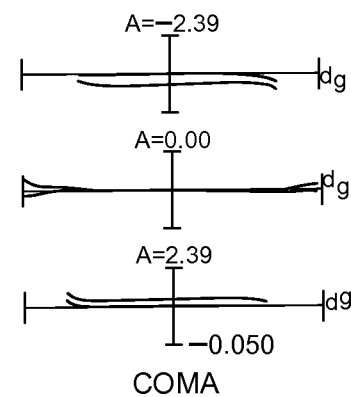

FIGS. 4A, 4B and 4C are graphs showing meridional transverse aberrations at the time of conducting vibration reduction upon focusing on the infinitely distant object in the wide-angle end state, in the intermediate focal length state and in the telephoto end state of the variable magnification optical system according to the first example of the present application, more specifically, meridional transverse aberrations in the center of the image plane and an image height±5.6 at the time when the V lens group GV is moved 0.1 mm in a direction perpendicular to the optical axis.

For example, in the variable magnification optical system according to the present example, since, in the wide-angle end state, the vibration coefficient is −1.25 and the focal length is 9.27 mm, with the V lens group GV being moved 0.1 mm from the optical axis, it is possible to correct a rotational shake of −0.77° of a plane of rotation including the optical axis.

In graphs showing various aberrations, FNO denotes an F number, NA denotes a numerical aperture of light incident on the first lens group G1, A denotes an incident angle of light, that is, a half angle of view (unit is "°"), and HO denotes an object height (unit is "mm". d and g show aberrations respectively at d-line (wavelength 587.6 nm) and at g-line (wavelength 435.8 nm). In the case where d or g is not written in the graphs, the graphs show aberrations at d-line. In graphs showing astigmatism, a solid line represents a sagittal image plane and a broken line represents a meridional image plane. Note that in graphs showing aberrations of a second example hereinafter described, the same symbols are used.

From the graphs showing the various aberrations, it is understood that the variable magnification optical system according to the present example corrects the various aberrations over from the wide-angle end state to the telephoto end state well thereby to have superb image forming performance, further have superb image forming performance even at the time of vibration reduction.

Second Embodiment

Figure 5A:
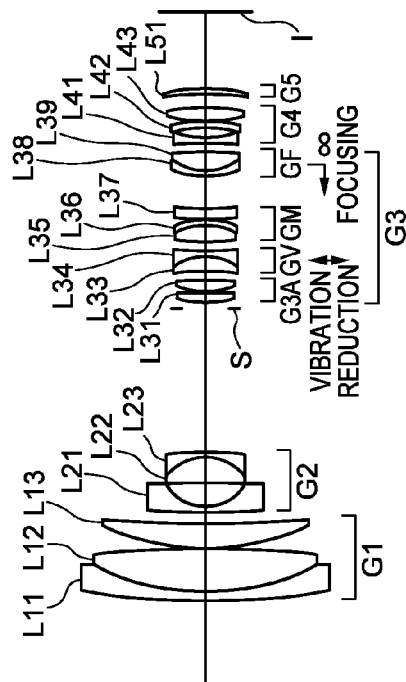
FIGS. 5A, 5B and 5C are sectional views showing a wide-angle end state, an intermediate focal length state and a telephoto end state of a variable magnification optical system according to a second example which is common to the first to third embodiments of the present application.
Figure 5B:
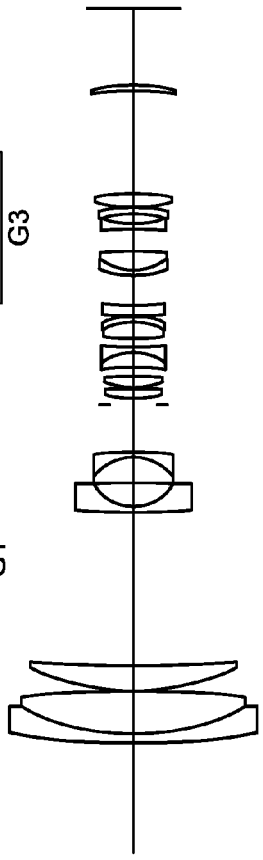
Figure 5C:
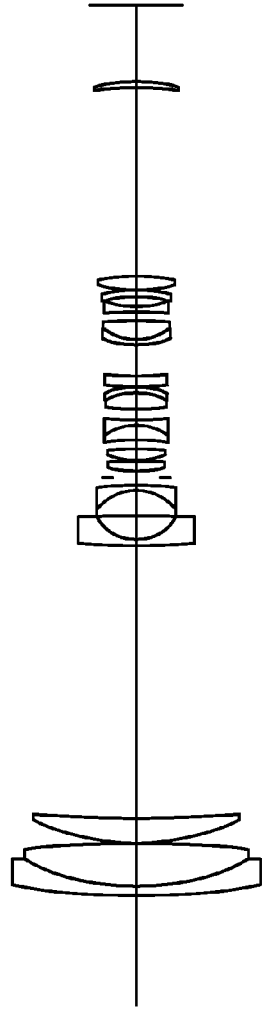

FIGS. 5A, 5B and 5C are sectional views showing a wide-angle end state, an intermediate focal length state and a telephoto end state of a variable magnification optical system according to a second example which is common to the first to third embodiments of the present application.

The variable magnification optical system according to the present example is composed of, in order from an object side: a first lens group G1 having positive refractive power; a second lens group G2 having negative refractive power; a third lens group G3 having positive refractive power; a fourth lens group G4 having negative refractive power; and a fifth lens group G5 having positive refractive power which is an R lens group.

The first lens group G1 consists of, in order from the object side, a cemented lens constructed by a negative meniscus lens L11 with a convex surface facing the object side cemented with biconvex positive lens L12, and a positive meniscus lens L13 with a convex surface facing the object side.

The second lens group G2 consists of, in order from the object side, a negative meniscus lens L21 with a convex surface facing the object side which is a first lens, and a cemented lens constructed by a positive meniscus lens L22 with a concave surface facing the object side which is a second lens cemented with a negative meniscus lens L23 with a concave surface facing the object side which is a third lens. The negative meniscus lens L21 is a compound type aspherical lens whose object side glass surface is provided with a resin layer so as to be an aspherical shape. The negative meniscus lens L23 is a glass mold type aspherical lens whose image side lens surface is made to be an aspherical shape.

The third lens group G3 is composed of, in order from the object side, a 3A lens group G3A having positive refractive power, a V lens group GV having negative refractive power, an M lens group GM having positive refractive power and an F lens group GF having positive refractive power.

The 3A lens group G3A consists of, in order from the object side, a positive meniscus lens L31 with convex surface facing the object side, and a biconvex positive lens L32.

The V lens group GV consists of, in order from the object side, a cemented lens constructed by a positive meniscus lens L33 with a concave surface facing the object side cemented with a biconcave negative lens L34. The negative lens L34 is a glass mold type aspherical lens whose image side lens surface is made to be an aspherical shape.

The M lens group GM consists of, in order from the object side, a cemented lens constructed by a biconvex positive lens L35 cemented with a negative meniscus lens L36 with concave surface facing the object side and a negative meniscus lens L37 with a convex surface facing the object side. The negative meniscus lens L37 is a glass mold type aspherical lens whose image side lens surface is made to be an aspherical shape.

The F lens group GF consists of, in order from the object side, a cemented lens constructed by a negative meniscus lens L38 with convex surface facing the object side cemented with a biconvex positive lens L39.

An aperture stop S is disposed on the object side of the third lens group G3.

The fourth lens group G4 consists of, in order from the object side, a biconvex negative lens L41, a negative meniscus lens L42 with a concave surface facing the object side and a biconvex positive lens L43.

The fifth lens group G5 consists of a positive meniscus lens L51 with a concave surface facing the object side. The positive meniscus lens L51 is a glass mold type aspherical lens whose image side lens surface is made to be an aspherical shape.

With the above-mentioned construction, in the variable magnification optical system according to the present example, upon zooming from the wide-angle end state to the telephoto end state, the first to the fourth lens groups G1 to G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5 are varied.

Specifically, the first lens group G1 to the fourth lens group G4 are moved to the object side upon zooming. The position of the fifth lens group G5 is fixed in a direction of the optical axis upon zooming. The aperture stop S is moved integrally with the third lens group G3 upon zooming.

Accordingly, upon zooming, the distance between the first lens group G1 and the second lens group G2 increases, the distance between the second lens group G2 and the third lens group G3 decreases, and the distance between the fourth lens group G4 and the fifth lens group G5 increases. Also, upon zooming, the distance between the third lens group G3 and the fourth lens group G4 increases from the wide-angle end state to the intermediate focal length state, and decreases from the intermediate focal length state to the telephoto end state. A distance between the 3A lens group G3A and the V lens group GV of the third lens group G3 is constant upon zooming.

Further, in the variable magnification optical system according to the present example, at the time of occurrence of a camera shake, the V lens group of the third lens group G3 is used as a vibration reduction lens group and moved so as to have a component in a direction perpendicular to the optical axis thereby to carry out vibration reduction.

Further, in the variable magnification optical system according to the present example, the F lens group of the third lens group G3 is used as a focusing lens group and moved along the optical axis to the object side thereby to carry out focusing from an infinitely distant object to a close object.

In the following Table 2, various values associated with the variable magnification optical system according to the present application are listed.

TABLE 2

Second Example

[Surface Data]

| m | r | d | nd | νd |
|---|---|---|---|---|
| OP | ∞ | | | |
| 1 | 144.9227 | 1.6350 | 1.903660 | 31.27 |
| 2 | 46.4543 | 7.6180 | 1.497820 | 82.57 |
| 3 | −280.8281 | 0.1000 | | |
| 4 | 45.6286 | 4.5089 | 1.804000 | 46.60 |
| 5 | 218.0774 | d5 | | |
| *6 | 500.0000 | 0.1000 | 1.553890 | 38.09 |
| 7 | 201.2901 | 1.0000 | 1.883000 | 40.66 |
| 8 | 8.9082 | 4.3024 | | |
| 9 | −176.6896 | 4.5658 | 1.808090 | 22.74 |
| 10 | −10.0014 | 1.0000 | 1.851350 | 40.10 |
| *11 | −200.0095 | d11 | | |
| 12 | ∞ | 0.9999 | Aperture Stop S | |
| 13 | 23.8529 | 1.8095 | 1.589130 | 61.22 |
| 14 | 486.6979 | 0.1519 | | |
| 15 | 15.8304 | 2.0358 | 1.487490 | 70.31 |
| 16 | −215.8847 | 1.8715 | | |
| 17 | −29.0336 | 2.6709 | 1.903660 | 31.27 |
| 18 | −9.9974 | 1.0000 | 1.801390 | 45.46 |
| *19 | 41.4658 | 1.8000 | | |
| 20 | 60.1509 | 3.0715 | 1.593190 | 67.90 |
| 21 | −10.4089 | 0.9998 | 2.000690 | 25.46 |
| 22 | −16.9605 | 0.0998 | | |
| 23 | 489.2464 | 1.6386 | 1.851350 | 40.10 |
| *24 | 70.3131 | 5.8990 | | |
| 25 | 15.2850 | 1.0000 | 2.001000 | 29.14 |
| 26 | 10.6499 | 3.7035 | 1.618000 | 63.34 |
| 27 | −78.8215 | d27 | | |
| 28 | −77.1108 | 1.0000 | 1.883000 | 40.66 |
| 29 | 19.2328 | 1.7995 | | |
| 30 | −28.7053 | 1.0000 | 1.902650 | 35.73 |
| 31 | −58.4684 | 0.2013 | | |
| 32 | 27.7625 | 2.4973 | 1.698950 | 30.13 |
| 33 | −42.9090 | d33 | | |
| 34 | −45.3546 | 0.9996 | 1.583130 | 59.44 |
| *35 | −30.7592 | BF | | |
| I | ∞ | | | |

[Aspherical Data]

| m | 6 |
|---|---|
| κ | −8.74540 |
| A4 | 2.25905E−05 |
| A6 | 1.19617E−07 |
| A8 | −4.53045E−09 |
| A10 | 3.58335E−11 |
| A12 | −1.06040E−13 |
| m | 11 |
| κ | 11.00000 |
| A4 | −5.72909E−05 |
| A6 | −2.83675E−07 |
| A8 | −4.14714E−10 |
| A10 | −6.09625E−11 |
| A12 | 0.00000 |
| m | 19 |
| κ | 1.00000 |
| A4 | −9.91318E−06 |
| A6 | −1.59863E−07 |
| A8 | 6.78573E−09 |
| A10 | −5.85391E−11 |
| A12 | 0.00000 |
| m | 24 |
| κ | 1.00000 |
| A4 | 4.62032E−05 |
| A6 | 1.66004E−07 |
| A8 | 1.04366E−09 |
| A10 | −3.63478E−11 |
| A12 | 0.00000 |
| m | 35 |
| κ | 1.00000 |
| A4 | 4.27991E−05 |
| A6 | 5.83932E−08 |
| A8 | −3.84157E−10 |
| A10 | 0.00000 |
| A12 | 0.00000 |

[Various Data]
Variable magnification ratio 14.13

| | W | | T |
|---|---|---|---|
| f | 9.27 | ~ | 130.95 |
| FNO | 3.59 | ~ | 5.68 |
| ω | 42.56 | ~ | 3.34° |
| Y | 8.00 | ~ | 8.00 |
| TL | 107.46 | ~ | 162.00 |

| | W | M | T |
|---|---|---|---|
| f | 9.27014 | 35.18344 | 130.95207 |
| ω | 42.56336 | 12.24162 | 3.33601 |
| FNO | 3.59 | 4.79 | 5.68 |
| φ | 9.52 | 9.52 | 9.52 |
| d5 | 2.00004 | 28.13283 | 49.85756 |
| d11 | 26.52876 | 8.54977 | 1.50011 |
| d27 | 1.49960 | 3.51536 | 1.49981 |
| d33 | 2.49961 | 19.00799 | 34.21187 |
| BF | 13.85090 | 13.85172 | 13.85176 |

[Moving Amount of Focusing Lens Group upon Focusing]

TABLE 2-continued

Second Example

|  | W | M | T |
|---|---|---|---|
| shooting magnification | −0.0100 | −0.0100 | −0.0100 |
| photograohing distance | 1012.6284 | 3571.8850 | 13006.4468 |
| moving amount | 0.0445 | 0.0953 | 0.2527 |

[Lens Group Data]

|  | ST | f |
|---|---|---|
| G1 | 1 | 73.95013 |
| G2 | 6 | −9.75125 |
| G3 | 13 | 19.75049 |
| G4 | 28 | −40.13288 |
| G5 | 34 | 159.88013 |

[Vibration Reduction Coefficient]

|  | W | M | T |
|---|---|---|---|
| vibration reduction coefficient | −1.23 | −1.77 | −2.13 |

[Values for Conditional Expressions]

(1) ff/(−fv) = 1.082
(2) (−fv)/f3 = 1.240
(3) (−fv)/f3A = 1.356
(4) ff/f3 = 1.342
(5) (−fv)/fm = 0.495
(6) ff/fm = 0.536
(7) f1/fw = 7.977
(8) (−f4)/f5 = 0.251
(9) f5/fw = 17.247
(10) (d4t − d4w)/ft = 0.242

Figure 6A:
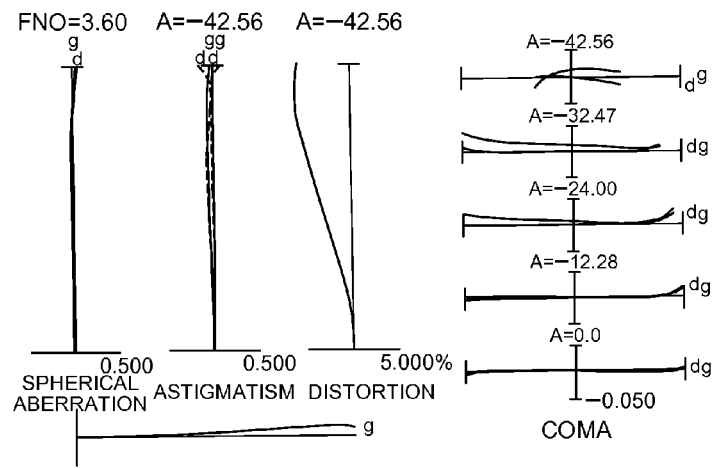
FIGS. 6A, 6B and 6C are graphs showing various aberrations upon focusing on an infinitely distant object in the wide-angle end state, in the intermediate focal length state and in the telephoto end state of the variable magnification optical system according to the second example of the present application.
Figure 6B:
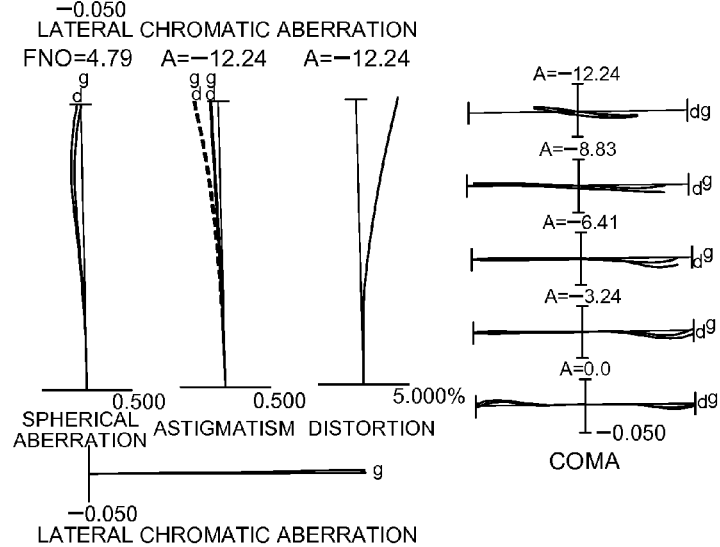
Figure 6C:
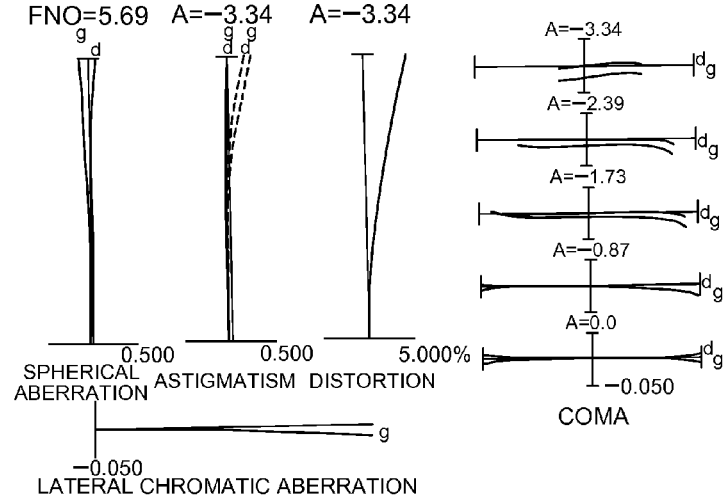

FIGS. 6A, 6B and 6C are graphs showing various aberrations upon focusing on an infinitely distant object in the wide-angle end state, in the intermediate focal length state and the telephoto end state of the variable magnification optical system according to the second example of the present application.

Figure 7A:
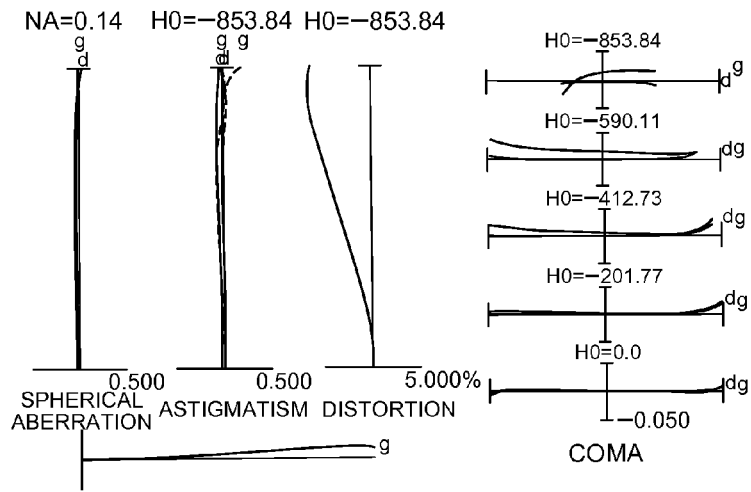
FIGS. 7A, 7B 7C are graphs showing various aberrations upon focusing on a close object (shooting magnification—0.01 times) in the wide-angle end state, in the intermediate focal length and in the telephoto end state of the variable magnification optical system according to the second example of the present application.
Figure 7B:
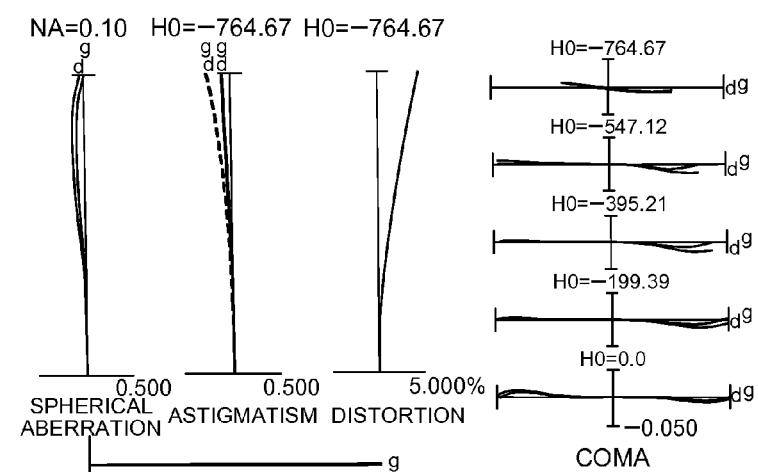
Figure 7C:
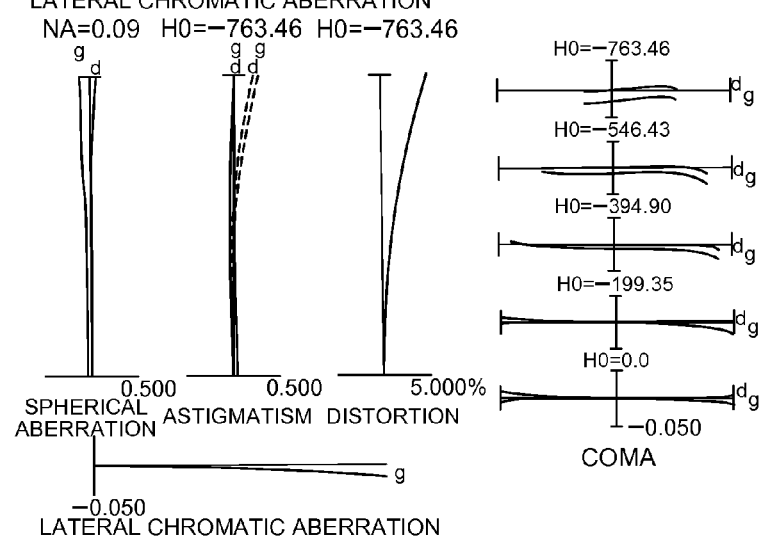

FIGS. 7A, 7B and 7C are graphs showing various aberrations upon focusing on a close object (shooting magnification—0.01 times) in the wide-angle end state, in the intermediate focal length and in the telephoto end state of the variable magnification optical system according to the second example of the present application.

Figure 8A:
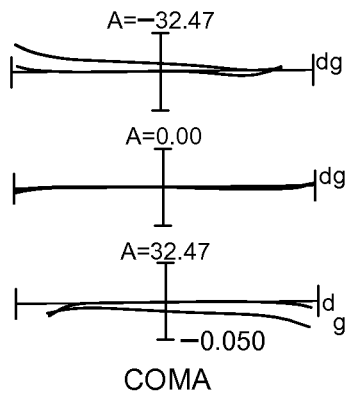
FIGS. 8A, 8B and 8C are graphs showing meridional transverse aberrations at the time of conducting vibration reduction upon focusing on the infinitely distant object in the wide-angle end state, in the intermediate focal length state and in the telephoto end state of the variable magnification optical system according to the second example of the present application.
Figure 8B:
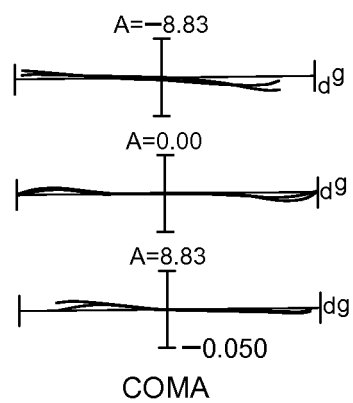
Figure 8C:
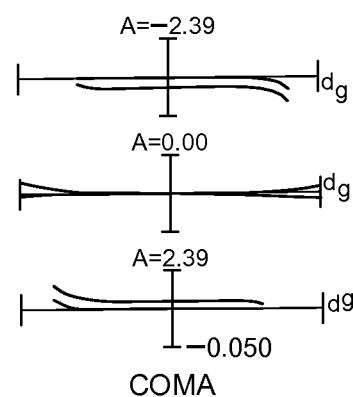

FIGS. 8A, 8B and 8C are graphs showing meridional transverse aberrations at the time of conducting vibration reduction upon focusing on the infinitely distant object in the wide-angle end state, in the intermediate focal length state and in the telephoto end state of the variable magnification optical system according to the second example of the present application, specifically, showing meridional transverse aberrations in the center of the image plane and an image height±5.6 at the time when the V lens group GV is moved 0.1 mm in a direction perpendicular to the optical axis.

For example, in the variable magnification optical system according to the present example, since, in the wide-angle end state, the vibration coefficient is −1.23 and the focal length is 9.27 mm, with the V lens group GV being moved 0.1 mm from the optical axis, it is possible to correct a rotational shake of −0.77° of the plane of rotation including the optical axis.

From the graphs showing the various aberrations, it is understood that the variable magnification optical system according to the present example corrects well the various aberrations over from the wide-angle end state to the telephoto end state thereby to have superb image forming performance, further have superb image forming performance even at the time of conducting vibration reduction.

According to the above examples, it is possible to achieve the compact variable magnification optical system with a high zoom ratio and high optical performance. Also, high optical performance can be achieved upon focusing and even when the lens group is moved so as to have the component in the direction perpendicular to the optical axis. The above examples are concrete examples of the invention of the present application and the invention of the present application is not limited thereto. Contents to be described below are adoptable in such a range as not deteriorating optical performance of the variable magnification optical system according to the first to the third embodiments of the present application.

Although the five-lens-group configuration is adopted in the variable magnification optical system according to the first to the third embodiments of the present application, the present application is not limited thereto and can adopt another-lens group configuration (for example, a six-lens group configuration). Specifically, a lens or a lens group may be added on the most object side and on the most image side of the variable magnification optical system of the first to the third embodiments of the present application. Note that the lens group means a portion including at least one single lens separated by air spaces.

Further, in the variable magnification optical system according to the first to the third embodiment of the present application, in order to conduct focusing from the infinitely distant object to the close object, a portion of the lens group, a whole lens group or a plurality of lens groups may be made as the focusing lens group and moved in the direction of the optical axis. Particularly, it is preferable to make at least a portion of the second lens group, at least a portion of the third lens group, at least a portion of the fourth lens group or at least portion of the fifth lens group to be the focusing lens group. Such a focusing lens group is adaptable to an autofocus and a motor for an autofocus, for example, drive by an ultrasonic motor.

Further, in the variable magnification optical system according to the first to the third embodiments of the present application, any lens group as a whole, or a portion of any lens group is made as the vibration reduction lens group and is moved so as to have a component perpendicular to the optical axis, or rotationally moved, oscillated or swayed in a direction of a plane including the optical axis to carry out vibration reduction. In the variable magnification optical system according to the first to the third embodiments of the present application, it is preferable to make at least a portion of the third lens group or at least a portion of the fourth lens group to be the vibration reduction lens group.

Further, the lens surfaces constituting the variable magnification optical system according to the first to the third embodiments of the present application may be spherical surfaces, plane surfaces or aspherical surfaces. In the case where a lens surface is a spherical surface or a plane surface, lens processing and assembling adjustment become easy, so that it is possible to prevent deterioration of optical performance due to errors of lens processing and assembling adjustment. So, this is preferable. Also, when the image plane is deviated, deterioration of image forming performance is small, so that it is preferable. In the case where a lens surface is an aspherical surface, the aspherical surface may be an aspherical surface formed by means of grinding, a glass mold type aspherical surface formed by molding a glass into an aspherical surface or a compound type aspherical surface formed by forming a resin on a surface of a glass so as to be an aspherical surface shape. Also, a lens surface may be a diffractive optical surface, and a lens may be a graded-index type lens (GRIN Lens) or a plastic lens.

Further, in the variable magnification optical system according to the first to the third embodiments, it is preferable to dispose the aperture stop in the third lens group or in the vicinity of the third lens group. Also, the member as the aperture stop may not be provided and a lens frame may be used for that role.

Further, a lens surface of the lens constituting the variable magnification optical system according to the first to the third embodiments of the present application may be formed with an antireflection coating having high transmittance in a wide wavelength. Thereby, flare and ghost images can be reduced, so that it is possible to achieve high contrast and high optical performance.

Next, a camera equipped with the variable magnification optical system according to the first to the third embodiments of the present application will be explained with reference to FIG. 9.

Figure 9:
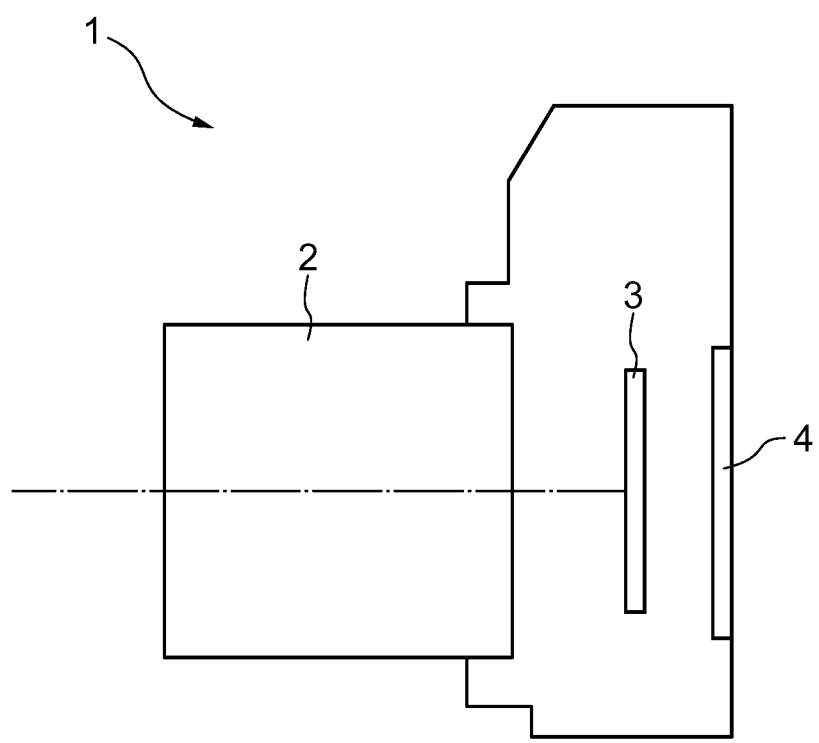
FIG. 9 is a diagram showing a camera equipped with the variable magnification optical system according to the first to third embodiments of the present application.

FIG. 9 is a diagram showing a camera equipped with the variable magnification optical system according to the first to third embodiments of the present application.

A camera 1 as shown in FIG. 9 is a lens interchangeable type so-called mirror-less camera equipped with the variable magnification optical system according to the first example as an imaging lens 2.

In the camera 1, light emitted from an unillustrated object is collected by the imaging lens 2 and passes through an unillustrated OLPF (Optical low pass filter) to form an object image on an imaging plane of an imaging part 3. Then, the object image is photo-electrically converted by a photoelectric conversion element provided in the imaging part to create an image of the object. The created image is displayed on an EVF (Electronic view finder) 4. Thereby a photographer can observe the object to be photographically taken via the EVF 4. Further, when the photographer presses an unillustrated release button all the way down, the image photo-electrically converted by the imaging part 3 is stored in an unillustrated memory. In such a manner, the photographer can take a picture of the object with the camera 1.

Here, the variable magnification optical system according to the first example mounted on the camera 1 as the imaging lens 2 is compact and has a high zoom ratio and high optical performance. Also, high optical performance can be achieved upon focusing and even when the lens group is moved so as to have the component in the direction perpendicular to the optical axis. Accordingly, it is possible to realize the compact camera 1 with a high zoom ratio and high optical performance and realize high optical performance upon focusing and even when the lens group is moved so as to have the component in the direction perpendicular to the optical axis. In a camera equipped with the variable magnification optical system according to the second example as the imaging lens 2, the same effect can be obtained. Further, the same effect can be obtained even in the case where a single-lens reflex camera which is provided with a quick return mirror and in which an object to be photographically taken is observed via a finder optical system.

Finally, a method for manufacturing the variable magnification optical system according to the first to the third embodiment will be explained with reference to FIGS. 10 to 12.

The method for manufacturing the variable magnification optical system according to the first embodiment shown in FIG. 10, is a method for manufacturing a variable magnification optical system which comprises, in order from an object side: a first lens group having positive refractive power; a second lens group having negative refractive power; and a third lens group having positive refractive power; the method comprising the following steps S11 to S13.

Step S11: Disposing in the variable magnification optical system a V lens group having negative refractive power to be moved so as to have the component in the direction perpendicular to the optical axis, and an F lens group having positive refractive power so as to be moved along the optical axis upon focusing from an infinitely distant object to a close object.

Step S12: Disposing in a lens barrel, the first to the third lens group, in order from the object side, and disposing the V lens group and the F lens group such that the V lens group is positioned on a more object side than the F lens group.

Step S13: Constructing such that, with providing a well-known moving mechanism in the lens barrel, upon zooming from a wide-angle end state to a telephoto end state, a distance between the first lens group and the second lens group and a distance between the second lens and the third lens group are varied.

According to the method for manufacturing the variable magnification optical system according to the first embodiment of the present application, it is possible to manufacture the compact variable magnification optical system with a high zoom ratio and high optical performance, high optical performance being achieved upon focusing and even when the lens group is moved in the direction perpendicular to the optical axis.

A method for manufacturing the variable magnification optical system according to the second embodiment shown in FIG. 11, is a method for manufacturing a variable magnification optical system which comprises, in order from an object side: a first lens group having positive refractive power; a second lens group having negative refractive power; and a third lens group having positive refractive power; the method comprising the following steps S21 to S22.

Step S21: Constructing the third lens group to include an F lens group having positive refractive power and being moved along the optical axis upon focusing from an infinitely distant object to a close object, and disposing in a lens barrel the first to the third lens groups in order from the object side.

Step S22: Constructing such that, with providing a well-known moving mechanism in the lens barrel, upon zooming from a wide-angle end state to a telephoto end state, a distance between the first lens group and the second lens group and a distance between the second lens and the third lens group are varied.

According to the method for manufacturing the variable magnification optical system according to the second embodiment of the present application, it is possible to manufacture the compact variable magnification optical system with a high zoom ratio and high optical performance, high optical performance being achieved upon focusing and even when the lens group is moved in the direction perpendicular to the optical axis.

A method for manufacturing for the variable magnification optical system according to the third embodiment shown in FIG. 12, is a method for manufacturing a variable magnification optical system which comprises, in order from an object side: a first lens group having positive refractive power; a second lens group having negative refractive power; a third lens group having positive refractive power; a fourth lens group having negative refractive power; and a fifth lens group having positive refractive power; the method comprising the following steps S31 to S32.

Step S31: Constructing the fourth lens group and the fifth lens group to satisfy the following conditional expression (8):

$$0.170 < (-f4)/f5 < 0.400 \qquad (8)$$

where f4 denotes a focal length of the fourth lens group, and f5 denotes a focal length of the fifth lens group; and disposing the first to the fifth lens group in a lens barrel in order from the object side.

Step S32: Constructing such that, with providing a well-known moving mechanism in the lens barrel, upon zooming from a wide-angle end state to a telephoto end state, a distance between the first lens group and the second lens group, a distance between the second lens and the third lens group, a distance between the third lens group and the fourth lens group and a distance between the fourth lens group and the fifth lens group are varied, the first lens group is moved along the optical axis and the position of the fifth lens group is fixed.

According to the method for manufacturing the variable magnification optical system according to the third embodiment of the present application, it is possible to manufacture the compact variable magnification optical system with a high zoom ratio and high optical performance.

What is claimed is:

1. A variable magnification optical system comprising, in order from an object side, a first lens group having positive refractive power; a second lens group having negative refractive power; and a third lens group having positive refractive power;
    upon zooming from a wide-angle end state to a telephoto end state, a distance between the first lens group and the second lens group and a distance between the second lens group and the third lens group being varied;
    a V lens group having negative refractive power and being movable so as to have a movement component in a direction perpendicular to an optical axis, and an F lens group having positive refractive power and being moved along the optical axis upon focusing from an infinitely distant object to a close object; and
    the V lens group being disposed closer than the F lens group to the object side.

2. The variable magnification optical system according to claim 1, wherein the following conditional expression is satisfied:

$$0.240 < ff/(-fv) < 4.000$$

where ff denotes a focal length of the F lens group, and fv denotes a focal length of the V lens group.

3. The variable magnification optical system according to claim 1, wherein a distance between the V lens group and the F lens group is unchangeable.

4. The variable magnification optical system according to claim 1, wherein a fourth lens group having negative refractive power is disposed on an image side of the third lens group; and
    upon zooming from the wide-angle end state to the telephoto end state, a distance between the third lens group and the fourth lens group is varied.

5. The variable magnification optical system according to claim 4, wherein a fifth lens group is disposed on an image side of the fourth lens group; and
    upon zooming from the wide-angle end state to the telephoto end state, a distance between the fourth lens group and the fifth lens group is varied.

6. The variable magnification lens system according to claim 1, wherein an R lens group is disposed at an image side of the variable magnification lens system, and upon zooming from the wide-angle end state to the telephoto end state, a position of the R lens group is fixed.

7. The variable magnification optical system according to claim 1, wherein the following conditional expression is satisfied:

$$0.280 < (-fv)/f3 < 5.200$$

where f3 denotes a focal length of the third lens group, and fv denotes a focal length of the V lens group.

8. The variable magnification optical system according to claim 1, wherein the third lens group includes the V lens group.

9. The variable magnification optical system according to claim 8, wherein the third lens group includes a 3A lens group having positive refractive power on an object side of the V lens group.

10. The variable magnification optical system according to claim 9, wherein the following conditional expression is satisfied:

$$0.300 < (-fv)/f3A < 3.800$$

where f3A denotes a focal length of the 3A lens group, and fv denotes a focal length of the V lens group.

11. The variable magnification optical system according to claim 9, wherein, upon zooming from the wide-angle end state to the telephoto end state, a distance between the 3A lens group and the V lens group is unchangeable.

12. The variable magnification optical system according to claim 1, wherein the following conditional expression is satisfied:

$$0.320 < ff/f3 < 5.200$$

where f3 denotes a focal length of the third lens group, and ff denotes a focal length of the F lens group.

13. The variable magnification optical system according to claim 1, wherein the third lens group includes the F lens group.

14. The variable magnification optical system according to claim 1, wherein the F lens group is disposed at an image side of the third lens group.

15. The variable magnification optical system according to claim 1, wherein an M lens group having positive refractive power is disposed between the V lens group and the F lens group.

16. The variable magnification optical system according claim 15, wherein the following conditional expression is satisfied:

$$0.110 < (-fv)/fm < 2.600$$

where fv denotes a focal length of the V lens group, and fm denotes a focal length of the M lens group.

17. The variable magnification optical system according to claim 15, wherein the following conditional expression is satisfied:

$$0.080 < ff/fm < 1.700$$

where ff denotes a focal length of the F lens group, and fm denotes a focal length of the M lens group.

18. The variable magnification optical system according to claim 1, wherein, upon zooming from the wide-angle end state to the telephoto end state, the distance between the first lens group and the second lens group increases.

19. The variable magnification optical system according to claim 1, wherein, upon zooming from the wide-angle end state to the telephoto end state, the distance between the second lens group and the third lens group decreases.

20. The variable magnification optical system according to claim 1, wherein, upon zooming from the wide-angle end state to the telephoto end state, the first lens group is moved toward the object side.

21. The variable magnification optical system according to claim 1, wherein, upon zooming from the wide-angle end state to the telephoto end state, the third lens group is moved toward the object side.

22. The variable magnification optical system according to claim 1, wherein, upon zooming from the wide-angle end state to the telephoto end state, the second lens group is moved along the optical axis.

23. The variable magnification optical system according to claim 1, wherein the second lens group is composed of, in order from the object side, a first lens having negative refractive power, a second lens having positive refractive power, and a third lens having negative refractive power.

24. The variable magnification optical system according to claim 23, wherein the second lens is cemented with the third lens.

25. The variable magnification optical system according to claim 23, wherein an object side lens surface of the first lens and an image side lens surface of the third lens are aspherical surfaces.

26. The variable magnification optical system according to claim 1, wherein the following conditional expression is satisfied:

$$5.500 < f1/fw < 9.000$$

where fw denotes a focal length of the variable magnification optical system in the wide-angle end state, and f1 denotes a focal length of the first lens group.

27. An optical apparatus equipped with the variable magnification optical system according to claim 1.

28. A method for manufacturing a variable magnification optical system, comprising:

arranging, in order from the object side: a first lens group having positive refractive power; a second lens group having negative refractive power; and a third lens group having positive refractive power; the method comprising the steps of:

disposing a V lens group having negative refractive power so as to be movable with a movement component in a direction perpendicular to an optical axis, and an F lens group having positive refractive power so as to be movable long the optical axis upon focusing from an infinitely distant object to a close object;

the V lens group being disposed closer than the F lens group to the object side; and constructing such that, upon zooming from a wide-angle end state to a telephoto end state, a distance between the first lens group and the second lens group and a distance between the second lens group and the third lens group are varied.

* * * * *